US012701565B2

US 12,701,565 B2

(12) United States Patent
Lee et al.

(10) Patent No.: US 12,701,565 B2
(45) Date of Patent: Aug. 4, 2026

(54) METHOD AND APPARATUS FOR TRANSMITTING AND RECEIVING SEMI PERSISTENT SCHEDULING PDSCH IN WIRELESS COMMUNICATION SYSTEM

(71) Applicant: LG ELECTRONICS INC., Seoul (KR)

(72) Inventors: Youngdae Lee, Seoul (KR); Jaehyung Kim, Seoul (KR); Duckhyun Bae, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 18/280,141

(22) PCT Filed: Apr. 27, 2023

(86) PCT No.: PCT/KR2023/005739
§ 371 (c)(1),
(2) Date: Sep. 1, 2023

(87) PCT Pub. No.: WO2023/211174
PCT Pub. Date: Nov. 2, 2023

(65) Prior Publication Data
US 2025/0024448 A1 Jan. 16, 2025

Related U.S. Application Data

(60) Provisional application No. 63/336,205, filed on Apr. 28, 2022, provisional application No. 63/336,168, filed on Apr. 28, 2022.

(51) Int. Cl.
*H04W 72/11* (2023.01)
*H04L 1/1829* (2023.01)
*H04W 72/232* (2023.01)

(52) U.S. Cl.
CPC ........... *H04W 72/11* (2023.01); *H04L 1/1864* (2013.01); *H04W 72/232* (2023.01)

(58) Field of Classification Search
CPC .... H04W 72/11; H04W 72/232; H04L 1/1864
See application file for complete search history.

(56) References Cited

U.S. PATENT DOCUMENTS

2021/0282164 A1* 9/2021 Zhou ...................... H04L 1/1861
2021/0298051 A1* 9/2021 Khoshnevisan .. H04W 72/0446
(Continued)

FOREIGN PATENT DOCUMENTS

EP        3944700        1/2022
WO    WO-2020194400 A1 * 10/2020 ............. H04L 1/189
(Continued)

OTHER PUBLICATIONS

PCT International Application No. PCT/KR2023/005739, International Search Report dated Aug. 7, 2023, 3 pages.
(Continued)

*Primary Examiner* — Michael J Moore, Jr.
(74) *Attorney, Agent, or Firm* — LEE, HONG, DEGERMAN, KANG & WAIMEY

(57) ABSTRACT

A method and apparatus for transmitting and receiving a semi-persistent scheduling PDSCH in a wireless communication system is disclosed. A method according to an embodiment of the present disclosure may include receiving, from a base station, respective configuration information related to one or more SPS configurations; receiving, from the base station, respective DCI for activating the one or more SPS configurations; and receiving, from the base station, the same TB through SPS PDSCH reception in a first SPS PDSCH resource set and a second SPS PDSCH resource set for the one or more SPS configurations.

10 Claims, 11 Drawing Sheets

(56) References Cited

U.S. PATENT DOCUMENTS

| | | | |
|---|---|---|---|
| 2022/0046589 A1* | 2/2022 | Takeda | H04W 72/046 |
| 2022/0104187 A1* | 3/2022 | Zhou | H04W 72/0446 |
| 2022/0322392 A1* | 10/2022 | Taherzadeh Boroujeni | |
| | | | H04W 72/56 |
| 2023/0051501 A1* | 2/2023 | Huang | H04L 1/1864 |
| 2025/0023697 A1* | 1/2025 | Lee | H04L 5/00 |
| 2025/0097956 A1* | 3/2025 | Khoshnevisan | H04W 72/232 |

FOREIGN PATENT DOCUMENTS

| | | |
|---|---|---|
| WO | 2022-005263 | 1/2022 |
| WO | 2022-074605 | 4/2022 |

OTHER PUBLICATIONS

3rd Generation Partnership Project, "Technical Specification Group Radio Access Network; NR; Physical layer procedures for data (Release 17)," 3GPP TS 38.214 V17.1.0, Mar. 2022, 227 pages.

* cited by examiner

METHOD AND APPARATUS FOR TRANSMITTING AND RECEIVING SEMI PERSISTENT SCHEDULING PDSCH IN WIRELESS COMMUNICATION SYSTEM

CROSS-REFERENCE TO RELATED APPLICATIONS

This application is the National Stage filing under 35 U.S.C. 371 of International Application No. PCT/KR2023/005739, filed on Apr. 27, 2023, which claims the benefit of U.S. Provisional Application Nos. 63/336,168, filed on Apr. 28, 2022, and 63/336,205, filed on Apr. 28, 2022, the contents of which are all hereby incorporated by reference herein in their entireties.

TECHNICAL FIELD

The present disclosure relates to a wireless communication system, and in more detail, relates to a method and an apparatus of transmitting and receiving semi-persistent scheduling (SPS) physical downlink shared channel (PDSCH) in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving an SPS PDSCH for a plurality of connected/associated SPS configurations.

A technical object of the present disclosure is to provide a method and an apparatus of transmitting and receiving an SPS PDSCH using a multi transmission reception point (M-TRP) for one or more SPS configurations.

The technical objects to be achieved by the present disclosure are not limited to the above-described technical objects, and other technical objects which are not described herein will be clearly understood by those skilled in the pertinent art from the following description.

A method performed by a user equipment (UE) in a wireless communication system according to an aspect of the present disclosure may include: receiving, from a base station, respective configuration information related to one or more semi-persistent scheduling (SPS) configurations: receiving, from the base station, respective downlink control information (DCI) for activating the one or more SPS configurations; and receiving, from the base station, the same transport block (TB) through SPS PDSCH reception in a first SPS physical downlink shared channel (PDSCH) resource set and a second SPS PDSCH resource set for the one or more SPS configurations. Different transmission configuration indication (TCI) states may be configured for the first SPS PDSCH resource set and the second SPS PDSCH resource set.

A method performed by a base station in a wireless communication system according to an additional aspect of the present may include: transmitting, to a user equipment (UE), respective configuration information related to one or more semi-persistent scheduling (SPS) configurations: transmitting, to the UE, respective downlink control information (DCI) for activating the one or more SPS configurations; and transmitting, to the UE, the same transport block (TB) through SPS PDSCH reception in a first SPS physical downlink shared channel (PDSCH) resource set and a second SPS PDSCH resource set for the one or more SPS configurations.

According to an embodiment of the present disclosure, it is possible to transmit and receive SPS PDSCHs for a plurality of connected/associated SPS configurations.

In addition, according to an embodiment of the present disclosure, an SPS PDSCH using M-TRP can be transmitted and received based on one or more SPS configurations.

In addition, according to an embodiment of the present disclosure, it is possible to prevent power consumption of a UE.

In addition, according to an embodiment of the present disclosure, a transmission resource can be efficiently managed by preventing unnecessary SPS transmission.

In addition, according to an embodiment of the present disclosure, it is possible to efficiently manage a CG resource in order to support a transmission extended reality (XR) operation.

In addition, according to an embodiment of the present disclosure, reliable transmission of important traffic is possible.

In addition, according to an embodiment of the present disclosure, signaling overhead can be reduced and system capacity can be increased.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

DETAILED DESCRIPTION

Figure 1:
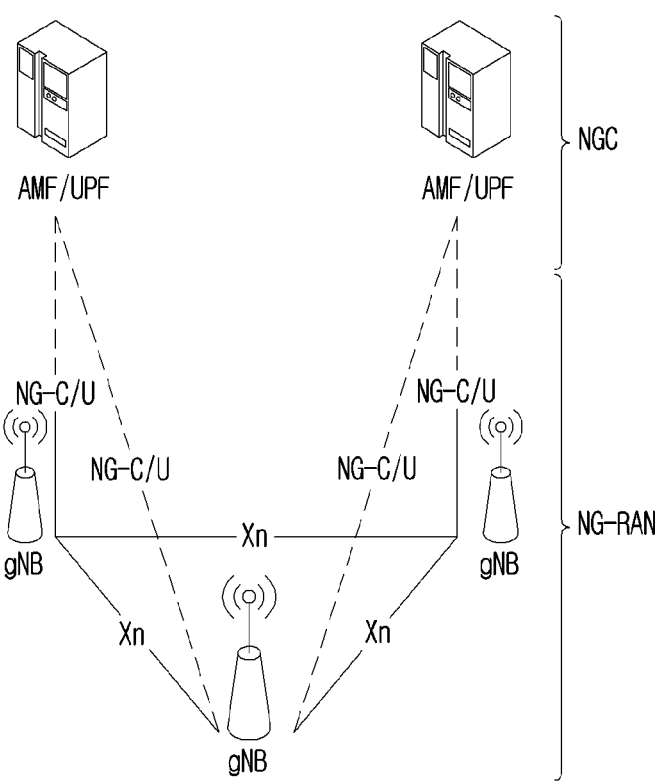
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

M: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
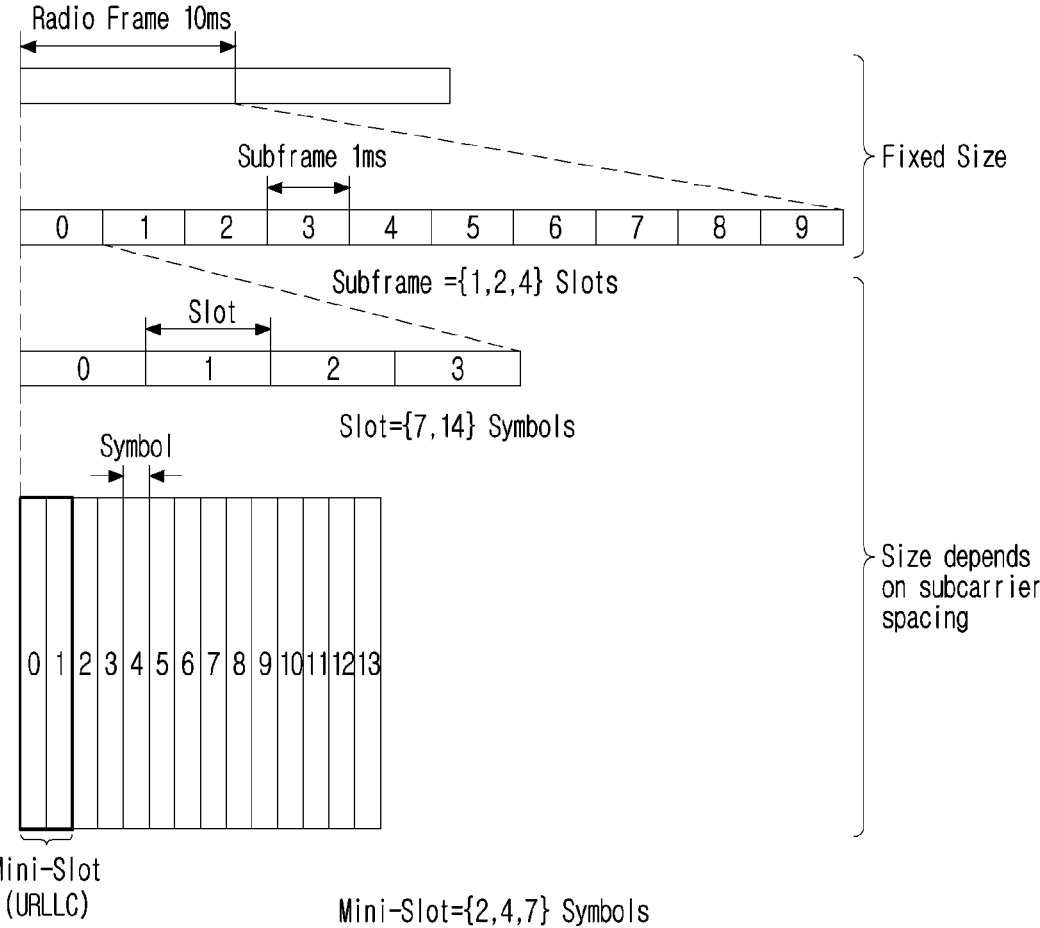
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described.

A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000)$. $T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})$ $T_c$ than a corresponding downlink frame in a corresponding terminal starts. For a subcarrier spacing configuration μ, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
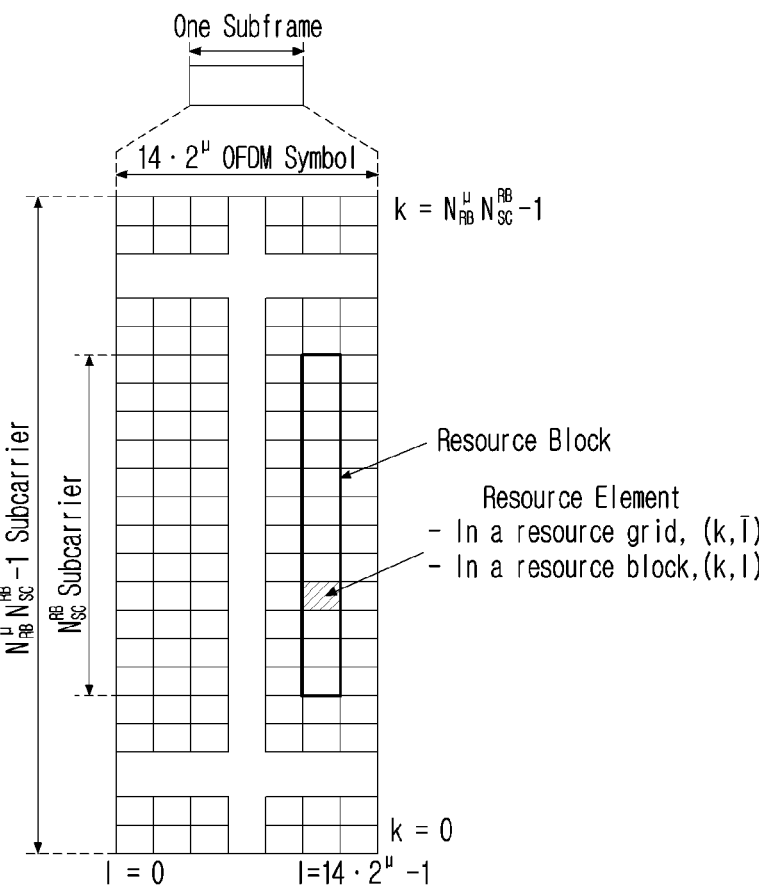
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per u and antenna port p. Each element of a resource grid for μ and an antenna port p is referred to as a resource element and is uniquely identified by an index pair (k,l'). Here, k=0, . . . , $N_{RB}^{\mu} N_{sc}^{RB}-1$ is an index in a frequency domain and 1'=0, . . . , $2^{\mu} N_{symb}^{(\mu)}-1$ refers to a position of a symbol in a subframe. When referring to a resource element in a slot, an index pair (k,l) is used. Here, 1=0, . . . , $N_{symb}^{\mu}-1$. A resource element (k,l') for μ and an antenna port p corresponds to a complex value, $a_{k,l'}^{(p,u)}$. When there is no risk of confusion or when a specific antenna port or numerology is not specified, indexes p and u may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration $\mu$. The center of subcarrier 0 of common resource block 0 for a subcarrier spacing configuration $\mu$ is identical to 'point A'. A relationship between a common resource block number $n_{CRB}^{\mu}$ and a resource element (k,l) for a subcarrier spacing configuration $\mu$ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
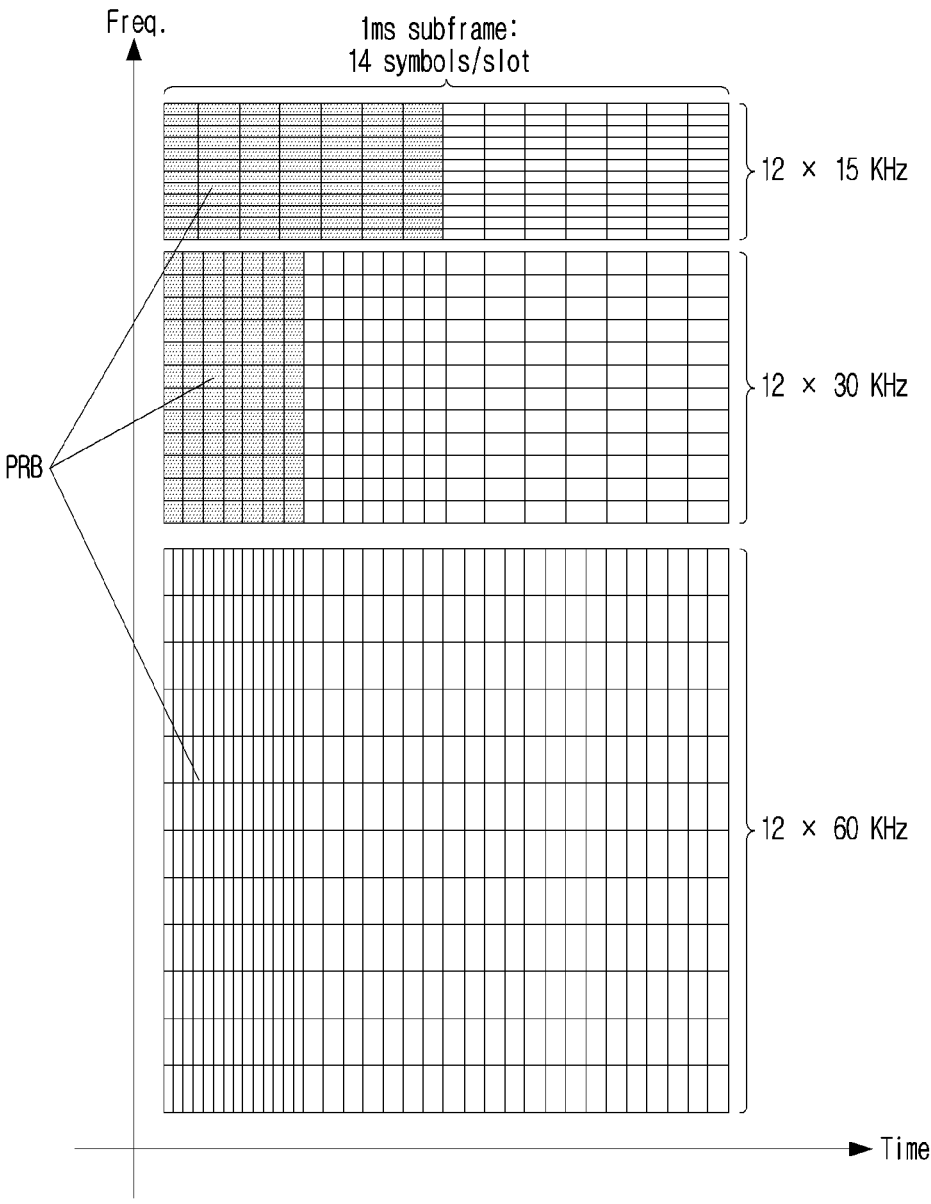
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
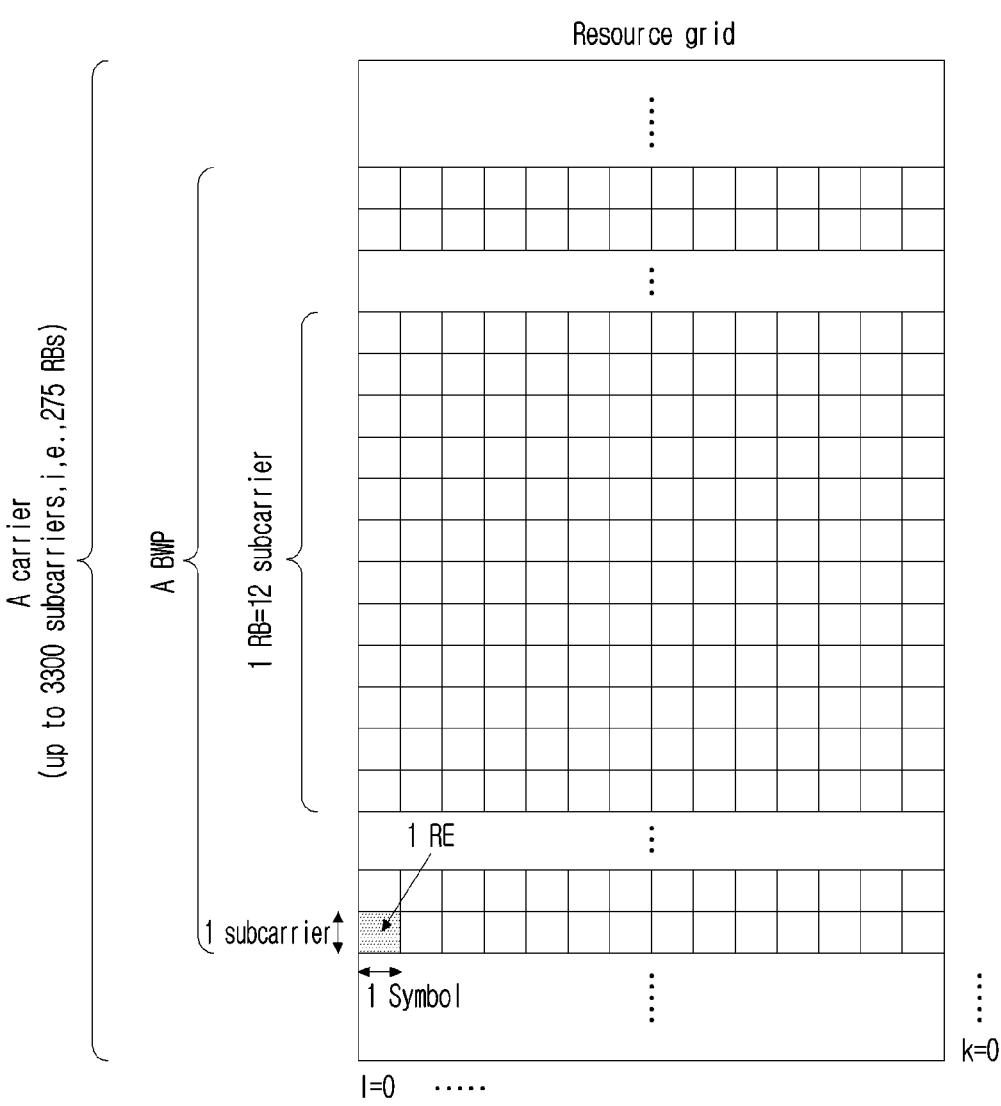
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
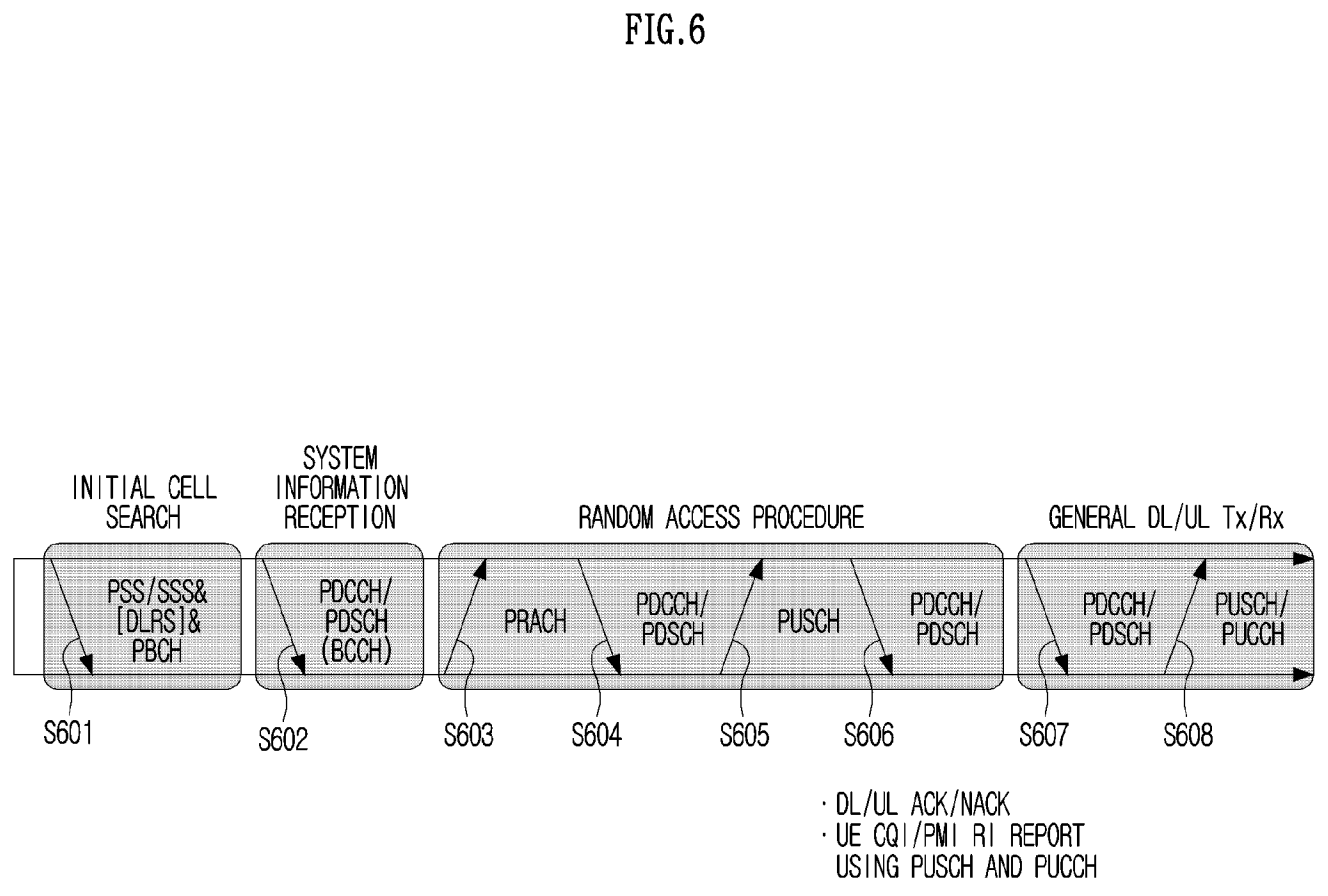

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH)

procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A quasi co-location type corresponding to each DL RS is given by a higher layer parameter qcl-Type of QCL-Info and may take one of the following values.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, when a target antenna port is a specific NZP CSI-RS, it may be indicated/configured that a corresponding NZP CSI-RS antenna port(s) is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (COMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a COMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

A UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH) transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR(scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, a higher layer parameter, ControlResourceSet information element (IE), is used to configure a time/frequency control resource set (CORESET). In an example, the control resource set (CORESET) may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/TCI information related to a CORESET, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

Hereinafter, a method for improving reliability in Multi-TRP will be described.

As a transmission and reception method for improving reliability using transmission in a plurality of TRPs, the following two methods may be considered.

Figure 7:
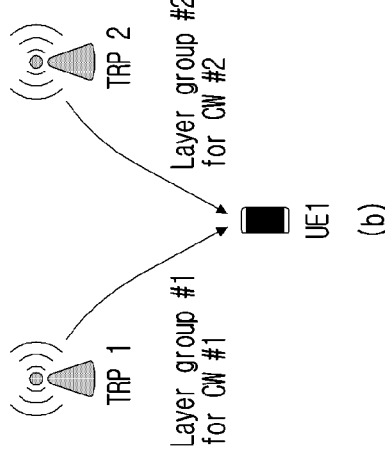
FIG. 7 illustrates a method of transmitting multiple TRPs in a wireless communication system to which the present disclosure may be applied.
Figure 7:
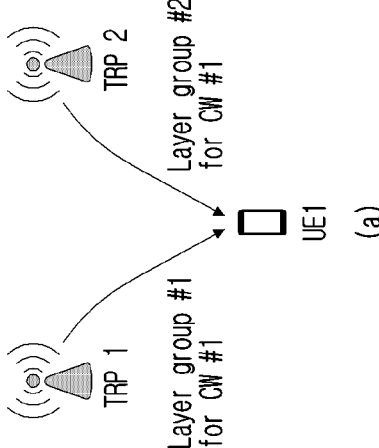

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to methods illustrated in FIG. 7(*a*) and FIG. 7(*b*) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Multi-TRP scheduled by at least one DCI may be performed as follows:

i) Scheme 1 (SDM): n (n is a natural number) TCI states in a single slot in overlapping time and frequency resource allocation Scheme 1a: Each transmission occasion is one layer or set of layers of the same TB, and each layer or set of layers is associated with one TCI and one set of DMRS port(s). A single codeword with one redundancy version (RV) is used for all layers or sets of layers. For a UE, different coded bits are mapped to different layers or sets of layers with specific mapping rules.

Scheme 1b: Each transmission occasion is one layer or set of layers of the same TB, and each layer or set of layers is associated with one TCI and one set of DMRS port(s). A single codeword with one RV is used for each spatial layer or set of layers. RVs corresponding to each spatial layer or set of layers may be the same or different.

Scheme 1c: Each transmission occasion is one layer of the same TB having one DMRS port associated with multiple TCI state indices or one layer of the same TB with multiple DMRS ports associated with multiple TCI indices in turn (one by one).

In schemes 1a and 1c described above, the same MCS is applied to all layers or sets of layers.

ii) Scheme 2 (FDM): n (n is a natural number) TCI states in a single slot in non-overlapping frequency resource allocation. Each non-overlapping frequency resource allocation is associated with one TCI state. The same single/multiple DMRS port(s) is associated with all non-overlapping frequency resource allocations.

Scheme 2a: A single codeword with one RV is used across an entire resource allocation. For UE, a common RB mapping (mapping of codeword to layer) is applied across all resource allocations.

Scheme 2b: A single codeword with one RV is used for each non-overlapping frequency resource allocation. RVs corresponding to each non-overlapping frequency resource allocation may be the same or different.

In scheme 2a, the same MCS is applied to all non-overlapping frequency resource allocations.

iii) Scheme 3 (TDM): n (n is a natural number) TCI states in a single slot in non-overlapping time resource allocation. Each transmission occasion of a TB has one TCI and one RV with time granularity of a mini-slot. All transmission occasion(s) in a slot use a common MCS with the same single or multiple DMRS port(s). An RV/TCI state may be the same or different among transmission occasions.

iv) Scheme 4 (TDM): n (n is a natural number) TCI states in K (n<=K, K is a natural number) different slots. Each transmission occasion of a TB has one TCI and one RV. All transmission occasion(s) across K slots use a common MCS with the same single or multiple DMRS port(s). An RV/TCI state may be the same or different among transmission occasions.

Hereinafter, in the present disclosure, DL MTRP-URLLC means that M-TRPs transmit the same data (e.g., transport block, TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is indicated which QCL RS/type (i.e., a DL TCI (state)) should be used in a layer/time/frequency resource receiving the same data/DCI from a base station. For example, when the same data/DCI is received in resource 1 and resource 2, a DL TCI state used in resource 1 and a DL TCI state used in resource 2 may be indicated. UE may achieve high reliability because it receives the same data/DCI through resource 1 and resource 2. Such DL MTRP URLLC may be applied to a PDSCH/a PDCCH.

Conversely, UL MTRP-URLLC means that M-TRPs receive the same data/UCI from UE by using a different layer/time/frequency resource. For example, TRP 1 receives the same data/UCI from UE in resource 1 and TRP 2 receives the same data/UCI from UE in resource 2 and shares received data/UCI through a backhaul link connected between TRPs. UE configured with a UL MTRP-URLLC transmission method transmits the same data/UCI by using a different layer/time/frequency resource. Here, UE is indicated which Tx beam and which Tx power (i.e., a UL TCI state) should be used in a layer/time/frequency resource transmitting the same data/DCI from a base station. For example, when the same data/UCI is received in resource 1 and resource 2, a UL TCI state used in resource 1 and a UL TCI state used in resource 2 may be indicated. Such UL MTRP URLLC may be applied to a PUSCH/a PUCCH.

In addition, in methods proposed in the present disclosure, when a specific TCI state (or a TCI) is used (/mapped) in receiving data/DCI/UCI for any frequency/time/space resource, it may mean that a DL estimates a channel from a DMRS by using a QCL type and a QCL RS indicated by a corresponding TCI state in that frequency/time/space resource and receives/demodulates data/DCI to an estimated channel. It may mean that an UL transmits/modulates a DMRS and data/UCI by using a Tx beam and/or Tw power indicated by a corresponding TCI state in that frequency/time/space resource.

The UL TCI state has Tx beam and/or Tx power information of UE and spatial relation information, etc. instead of a TCI state may be configured to UE through other parameter. An UL TCI state may be directly indicated to UL grant DCI or may mean spatial relation information of an SRS resource indicated by an SRI (SRS resource indicator) field of UL grant DCI. Alternatively, it may mean an OL (open loop) Tx power control parameter connected to a value indicated by a SRI field of UL grant DCI (j: an index for open loop parameter Po and alpha (a) (up to 32 parameter value sets per cell), q_d: an index of a DL RS resource for PL (pathloss) measurement (measurement of up to 3 per cell), 1: a closed loop power control process index (up to 2 processes per cell)).

On the other hand, it is assumed that MTRP-eMBB means that M-TRPs transmit other data by using a different layer/time/frequency, UE configured with a MTRP-eMBB transmission method is indicated multiple TCI states with DCI and data received by using a QCL RS of each TCI state is different data.

In addition, whether of MTRP URLLC transmission/reception or MTRP eMBB transmission/reception may be understood by UE by separately classifying a RNTI for MTRP-URLLC and a RNTI for MTRP-eMBB and using them. In other words, when CRC masking of DCI is performed by using a RNTI for URLLC, it is considered as URLLC transmission and when CRC masking of DCI is performed by using a RNTI for eMBB, it is considered as eMBB transmission. Alternatively, a base station may configure MTRP URLLC transmission/reception or may configure MTRP eMBB transmission/reception to UE through other new signaling.

In the present disclosure, for convenience of a description, a proposal is applied by assuming cooperative transmission/reception between 2 TRPs, but it may be extended and applied in 3 or more multi-TRP environments and it may be also extended and applied in multi-panel environments. A different TRP may be recognized by UE as a different transmission configuration indication (TCI) state. That is, when UE receives/transmits data/DCI/UCI by using TCI state 1, it means that data/DCI/UCI is received/transmitted from/to TRP 1.

A proposal of the present disclosure may be utilized in a situation where MTRP cooperatively transmits a PDCCH (the same PDCCH is repetitively or partitively transmitted) and some proposals may be utilized even in a situation where MTRP cooperatively transmits a PDSCH or cooperatively receives a PUSCH/a PUCCH.

In addition, in the present disclosure below, the meaning that a plurality of base stations (i.e., MTRP) repetitively transmits the same PDCCH may mean the same DCI is transmitted by a plurality of PDCCH candidates, and it is equivalent with the meaning that a plurality of base stations repetitively transmits the same DCI. The same DCI may mean two DCI with the same DCI format/size/payload. Alternatively, although two DCI have a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception time of DCI. Here, if DCI received at a time of n and DCI received at a time of n+1 represent the same scheduling result to UE, a TDRA field of two DCI is different, and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of other DCI. For example, when the same data is repetitively transmitted N times through TDM, DCI 1 received before first data indicates N data repetitions and DCI 2 received after first data and before second data indicates N-1 data repetitions. Scheduling data of DCI 2 becomes a subset of scheduling data of DCI 1 and two DCI is scheduling for the same data, so in this case, it may be considered the same DCI.

In addition, in the present disclosure below, when a plurality of base stations (i.e., MTRP) divide and transmit the same PDCCH, it may mean that one DCI is transmitted through one PDCCH candidate, but TRP 1 transmits some resources in which the PDCCH candidate is defined and TRP 2 transmits the remaining resources. For example, when TRP 1 and TRP 2 divide and transmit a PDCCH candidate corresponding to an aggregation level m1+m2, the PDCCH candidate is divided into PDCCH candidate 1 corresponding to aggregation level m1 and PDCCH candidate 2 corresponding to aggregation level m2, and TRP 1 transmits the PDCCH candidate 1 and TRP 2 transmits the PDCCH candidate 2 using different time/frequency resources. After receiving the PDCCH candidate 1 and the PDCCH candidate 2, a UE generates a PDCCH candidate corresponding to aggregation level m1+m2 and attempts DCI decoding.

When the same DCI is divided and transmitted to several PDCCH candidates, there may be two implementation methods.

First, a DCI payload (control information bits+CRC) may be encoded through one channel encoder (e.g., a polar encoder), coded bits obtained as a result may be divided into two TRPs and transmitted. In this case, an entire DCI payload may be encoded in coded bits transmitted by each TRP, or only a part of a DCI payload may be encoded. Second, a DCI payload (control information bits+CRC) may be divided into two (DCI 1 and DCI 2) and each can be encoded through a channel encoder (e.g., polar encoder). Thereafter, two TRPs may transmit coded bits corresponding to DCI 1 and coded bits corresponding to DCI 2, respectively.

In summary, it may be as follows that a plurality of base stations (i.e., MTRP) divide/repeat the same PDCCH and transmit over a plurality of monitoring occasions (MO).

i) it may mean that each base station (i.e., STRP) repeatedly transmits coded DCI bits obtained by encoding all DCI contents of a corresponding PDCCH through each MO: or, ii) it may mean that coded DCI bits obtained by encoding all DCI contents of a corresponding PDCCH are divided into a plurality of parts, and each base station (i.e., STRP) transmits a different part through each MO; or iii) it may mean that DCI contents of a corresponding PDCCH are divided into a plurality of parts, and each base station (i.e., STRP) separately encodes different parts and transmits them through each MO.

That is, it may be understood that a PDCCH is transmitted multiple times over several transmission occasions (TO) regardless of repeated transmission or divided transmission of the PDCCH. Here, a TO means a specific time/frequency resource unit in which a PDCCH is transmitted. For example, if a PDCCH is transmitted multiple times (in a specific resource block (RB)) over slots 1, 2, 3, and 4, a TO may mean each slot, or if a PDCCH is transmitted multiple times (in a specific slot) over RB sets 1, 2, 3, and 4, a TO may mean each RB set, or if a PDCCH is transmitted multiple times over different times and frequencies, a TO may mean each time/frequency resource. In addition, a TCI state used for DMRS channel estimation for each TO may be configured differently, and it may be assumed that TOs in which a TCI state is configured differently are transmitted by different TRPs/panels. When a plurality of base stations repeatedly transmits or dividedly transmits a PDCCH, it means that the PDCCH is transmitted over a plurality of TOs, and the union of TCI states configured in corresponding TOs is configured with two or more TCI states. For example, if a PDCCH is transmitted over TOs 1,2,3,4, TCI states 1,2,3,4 may be configured in each of TOs 1,2,3,4, respectively, which means that TRP i transmits cooperatively a PDCCH in TO i.

For a plurality of TOs indicated to a UE to repeatedly transmit or dividedly transmit a PDCCH/PDSCH/PUSCH/PUCCH, UL transmits to a specific TRP or DL receives from a specific TRP in each TO. Here, a UL TO (or TO of TRP 1) transmitted to TRP 1 means a TO using the first value among two spatial relations, two UL TCIs, two UL power A UE may report support of SPS to a base station using a downlinkSPS flag in UE capability information.

For SPS, RRC signaling and physical layer signaling on a PDCCH are combined and used. RRC signaling (e.g., SPS-Config IE) provides a subset of resource allocation information, and additional information is provided by a PDCCH. In addition, a PDCCH is used as a trigger of activation/release.

Table 6 illustrates an example of the SPS-Config IE. SPS-Config IE is used to configure downlink semi-persistent transmission. Multiple downlink SPS configurations in one BWP of a serving cell may be configured.

TABLE 6

```
-- ASN1START
-- TAG-SPS-CONFIG-START
SPS-Config ::=                SEQUENCE {
    periodicity                ENUMERATED {ms10, ms20, ms32, ms40, ms64,
ms80, ms128, ms160, ms320, ms640,
                                    spare6, spare5, spare4, spare3,
spare2, spare1},
    nrofHARQ-Processes          INTEGER (1..8),
    n1PUCCH-AN                  PUCCH-ResourceId
OPTIONAL,   -- Need M
    mcs-Table                   ENUMERATED {qam64LowSE}
OPTIONAL,   -- Need S
    ...,
    [[
    sps-ConfigIndex-r16         SPS-ConfigIndex-r16
OPTIONAL,   -- Cond SPS-List
    harq-ProcID-Offset-r16      INTEGER (0..15)
OPTIONAL,   -- Need R
    periodicityExt-r16          INTEGER (1..5120)
OPTIONAL,   -- Need R
    harq-CodebookID-r16         INTEGER (1..2)
OPTIONAL,   -- Need R
    pdsch-AggregationFactor-r16 ENUMERATED {n1, n2, n4, n8 }
OPTIONAL    -- Need S
    ]]
}
-- TAG-SPS-CONFIG-STOP
-- ASN1STOP
``` control parameters and/or two pathloss reference signals (PLRS) indicated to a UE, and a UL TO (or TO of TRP 2) transmitted to TRP 2 means a TO using the second value among two spatial relations, two UL TCIs, two UL power control parameters and/or two PLRSs indicated to a UE. Similarly, for DL transmission, a DL TO (or TO of TRP 1) transmitted by TRP 1 means a TO using the first value among two DL TCI states (e.g., when two TCI states are configured in CORESET) indicated to a UE, and a DL TO (or TO of TRP 2) transmitted by TRP 2 means a TO using the second value among two DL TCI states (e.g., when two TCI states are configured in CORESET) indicated to a UE.

The proposal of the present disclosure can be extended and applied to various channels such as PUSCH/PUCCH/PDSCH/PDCCH.

The proposal of the present disclosure can be extended and applied to both a case of repeated transmission and a case of divided transmission the channel on different time/frequency/spatial resources.

Downlink semi-persistent scheduling (SPS)

In downlink SPS, persistent scheduling through higher layer signaling (RRC, etc.) and dynamic scheduling of lower layer signaling (DCI, etc.) are combined. Persistent scheduling is used for periodic resource allocation for an initial transmission of a transport block (TB). Dynamic scheduling is used for resource allocation for retransmission when retransmission is required.

In Table 6, the periodicity represents a period of a downlink SPS, which means a time duration between continuous persistent resource allocations. The periodicityExt is used to calculate a period of downlink SPS, and if this parameter does not exist, the periodicity is ignored. An SPS period has different supported values depending on configured subcarrier spacing.

The nrofHARQ-Processes represents a number of a HARQ process configured for downlink SPS. In the case of dynamic resource allocation, a HARQ process identifier is specified in DCI associated with each resource allocation. However, in downlink SPS, an identifier of a HARQ process is determined based on the nrofHARQ-Processes value and the periodicity value.

The n1PUCCH-AN indicates a HARQ resource of a PUCCH for downlink SPS. An actual PUCCH-Resource is configured according to the value of n1PUCCH-AN, and based on this, a PUCCH resource for transmitting a HARQ ACK to a base station are identified. The mcs-Table indicates an MCS table used by a UE for downlink SPS.

The pdsch-AggregationFactor indicates the number of repetitions of an SPS PDSCH and may have one value among {1,2,4,8}. If this field does not exist, a UE applies pdsch-AggregationFactor of PDSCH-Config. That is, a UE repeatedly receives the same downlink data/transport block (TB) in consecutive slots.

When a scheduled PDSCH is received without corresponding PDCCH transmission using SPS-config, the same symbol allocation is applied over consecutive slots according to the configured repetition number (pdsch-Aggregation-Factor). That is, a UE repeatedly receives a downlink TB in the same symbol over several consecutive slots according to the configured number of repetitions. When repetitive transmission is configured, a PDSCH is limited to a single transmission layer.

In a PDSCH scheduled without corresponding PDCCH transmission using SPS-config, a time duration for reception according to the number of repetitions (pdsch-Aggregation-Factor) is not greater than a duration derived by a period obtained from SPS-config.

A redundancy version (rv_id) is determined differently for each TO of a TB. In a PDSCH scheduled without corresponding PDCCH transmission using SPS-config, it is assumed that a redundancy version indicated by DCI is 0.

After downlink assignment is configured for SPS, a MAC entity sequentially considers that the Nth (N≤0) downlink assignment is generated within a slot according to Equation 3 below. That is, when SPS is configured, an SPS PDSCH may be transmitted at a transmission occasion/opportunity that satisfies Equation 3 below.

$$(numberOfSlotsPerFrame \times SFN + \quad \text{[Equation 3]}$$
$$\text{slot number in the frame}) =$$
$$[(numberOfSlotsPerFrame \times SFN_{start\,time} + slot_{start\,time}) +$$
$$N \times periodicity \times numberOfSlotsPerFrame/10]$$
$$\text{modulo } (1024 \times numberOfSlotsPerFrame)$$

In Equation 3, numberOfSlotsPerFrame represents a number of slots per frame. SFNstart time and slotstart time are an SFN and a slot of the first transmission of a PDSCH in which a DL assignment configured for an SPS configuration was (re) initialized, respectively. In other words, SFNstart time and slotstart time are an SFN number and a slot number of the first PDSCH allocated based on a TDRA field in DCI, respectively. A configured DL allocation may be configured as a set of periodic SPS PDSCH occasions for an SPS configuration. The periodicity represents a period of DL SPS (see Table 6).

Meanwhile, in the case of dynamic resource allocation on a PDCCH, an HARQ process ID (HARQ process identity) is specified in DCI, whereas in the case of SPS, since DCI is not received before each PDSCH transmission, a HARQ process is calculated according to Equation 4 or 5 below. A base station may configure the number of HARQ processes (e.g., nrofHARQ-Processes) and an offset (e.g., harq-ProcID-Offset) used to derive a HARQ process ID.

If an offset (e.g., harq-ProcID-Offset) used to derive a HARQ process ID is not configured, a UE derives a HARQ process ID associated with a slot in which downlink transmission starts from Equation 4 below. Alternatively, if an offset (e.g., harq-ProcID-Offset) used to derive a HARQ process ID is configured, a UE derives a HARQ process ID associated with a slot in which downlink transmission starts from Equation 5 below.

$$HARQ \text{ Process } ID = \quad \text{[Equation 4]}$$
$$[floor(CURRENT\_slot \times$$

-continued
$$10/(numberOfSlotsPerFrame \times periodicity))]$$
$$\text{modulo } nrofHARQ - Processes$$

$$HARQ \text{ Process } ID = [floor(CURRENT\_slot \times \quad \text{[Equation 5]}$$
$$10/(numberOfSlotsPerFrame \times periodicity))]$$
$$\text{modulo } nrofHARQ - Processes + harq - ProcID - \text{Offset}$$

In Equations 4 and 5, nrojHARQ-Processes defines the number of downlink HARQ processes and may have a value from 1 to 8 (see Table 6). nrojHARQ-Processes is used to identify a HARQ process ID for specific PDSCH transmission.

Method for Transmitting and Receiving a Semi-Persistent Scheduling (SPS) PDSCH

In the present disclosure, when image information of an extended reality (XR) service is transmitted through preconfigured resources such as semi-persistent scheduling (SPS) of the NR wireless communication system, a method for reducing power consumption and increasing efficiency of radio resources while guaranteeing availability and reliability of transmission resources is proposed.

In NR, one or more SPS PDSCHs may be configured for a UE for periodic transmission and reception or low delay time and PDCCH overhead. In each SPS configuration, a configuration/indicated resource may be repeated with a period. That is, initially configured/indicated resource allocation is repeated with a configured periods and a UE can receive downlink transmission from corresponding resources without a separate PDCCH reception process.

Meanwhile, there are various types of data that can be generated in XR. Among these data, it is considered that transmission and reception of sensor and location information and video data of a UE, which are generally reported with a specific period, are transmitted and received in SPS resources. Data generation time (traffic arrival time) for such data is not always constant and jitter may occur due to reasons such as a video encoding time, a sensor measurement time, an operation of a higher layer, or a routing change of a network to be delivered.

If a resource is allocated to a location sufficiently distant in time from an expected traffic generation point in consideration of jitter, etc., availability of a resource can be guaranteed, but a delay time may occur. Conversely, if an SPS resource with a fixed period is allocated at a time of expected data generation, a larger delay may occur due to a waiting time until a next available resource when jitter occurs.

In addition, since some data are generated based on events, it is impossible to accurately determine an actual data generation time, but it is considered to use SPS resources for these data in order to reduce a delay caused by scheduling. In this case, skipping methods in which a sufficient number of resources are allocated in a short period in preparation for data generation, a UE or a base station selectively uses these resources, and other resources are not actually used are conventionally discussed. However, in order to use the method of skipping transmission and reception, it is necessary to consider response signals between a UE and a base station for conforming reception and transmission. If a UE transmits a response signal even for unreceived transmission, a base station needs to always prepare a resource for the UE to transmit a response signal. And, for these resources, considering that the skipping method is based on configuring a sufficiently large number of resources in radio resources, it may occur as a large uplink burden. In addition, considering that these resources can be multiplexed between UEs, a burden of uplink resources should be considered more importantly.

Since securing low latency is essential for a quality of XR service, it is necessary to consider a method of minimizing an effect on latency while reducing an effect of jitter. In order to solve this problem, the present disclosure deals with a method of selectively using some of a plurality of SPS resources configured between a UE and a base station and simplifying and transmitting a response to the used SPS resources at a predetermined location.

A group of pictures (GOP) of video coding may include the following picture types.

An I picture or I frame (i.e., an intra coded picture) (which may also be referred to as a key frame or an i-frame) is a picture that is coded independently of all other pictures. Each GOP starts with a picture of this type (in decoding order).

A P picture or P frame (i.e., a predictive coded picture) includes motion-compensated difference information relative to previously decoded pictures. For example, in older designs such as H.262/MPEG-2 and H.263, each P picture can only refer to one picture, the corresponding picture should precede the P picture in display order and decoding order, and should be an I or P picture. These restrictions do not apply to the new standards H.264/MPEG-4 AVC and HEVC.

A B picture or B frame (bipredictive coded picture) includes motion-compensated difference information relative to previously decoded pictures. For example, in MPEG-1 and older designs such as H.262/MPEG-2, each B-picture can only refer to two pictures, one precedes the B picture in display order and the other follows the B picture, and all referenced pictures should be either I or P pictures. These restrictions do not apply to the new standards H.264/MPEG-4 AVC and HEVC.

A D picture or D frame (direct coded (DC) picture) serves as a fast access indication of a picture for loss robustness or fast-forward. D pictures are used only in MPEG-1 video.

Figure 8:
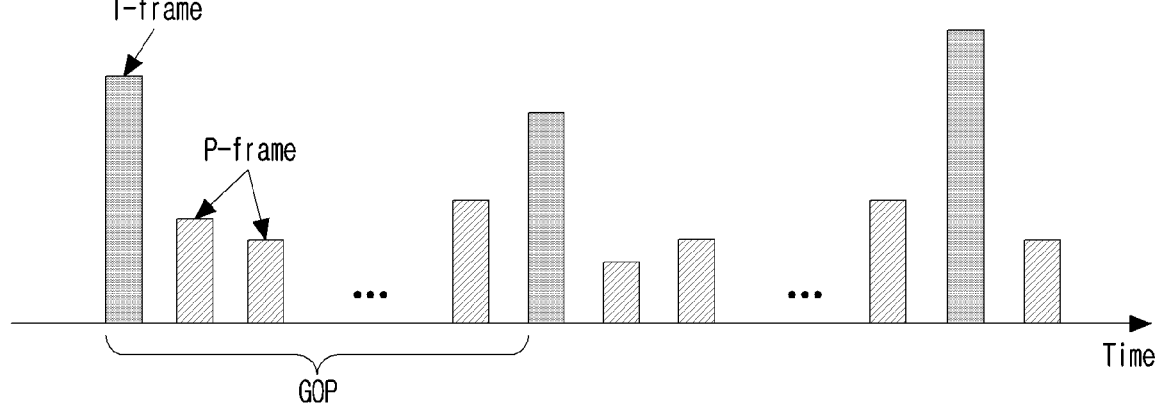
FIG. 8 illustrates a structure/pattern of a group of pictures.

FIG. 8 illustrates a structure/pattern of a group of pictures.

Referring to FIG. 8, an I frame indicates a start of a GOP. This is followed by several P and B frames. In the previous design, an ordering and a reference structure allowed were relatively limited.

A GOP structure is often referred to by two numbers, e.g., M=3, N=12. The first number (M) represents a distance between two anchor frames (I or P). The second number (N) is a GOP size that informs a distance between two full images (I-frames). For example, in the case of M=3 and N=12, a GOP structure is IBBPBBPBBPBBI. Instead of the M parameter, the maximum number of B frames between two consecutive anchor frames may be used.

For example, in a sequence with the pattern IBBBBPBBBBBPBBBBBI, a GOP size (N value) is 15 (a length between two I frames) and a distance (M value) between two anchor frames is 5 (a length between an I frame and a P frame or between two consecutive P frames).

An I frame includes a full image and no additional information is required to reconstruct it. Generally, an encoder use a GOP structure that allows each I frame to be a "clean random access point". Thus, decoding can start cleanly at an I-frame and any errors in a GOP structure are corrected after processing a correct I-frame.

Hereinafter, the present disclosure describes a method proposed based on semi-static downlink SPS radio resources, but this is for convenience of description, the methods proposed in the present disclosure are not limited thereto. Accordingly, those skilled in the art can understand that the methods proposed in the present disclosure can be extended and applied to a radio resource through dynamic scheduling received by a UE. For example, a method in which a UE determines one HARQ-ACK timing for a plurality of allocated downlink radio resources may be applied regardless of an SPS PDSCH or a PDSCH indicated by dynamic scheduling. In addition, the methods proposed in the present disclosure can be applied even when a plurality of radio resources are not semi-statically configured but set through dynamic indication, for example, when a plurality of radio resources are configured at once through DCI. Accordingly, the methods proposed in the present disclosure can be applied to all types of transmission/reception schemes expected by a base station and a UE as long as the principle of the proposed method is not infringed, even if there is no separate explanation. Hereinafter, in the present disclosure, for convenience of description, semi-persistent scheduling (SPS) can be used as a general concept collectively referring to semi-statically configured radio resources (e.g., DL/UL SPS, CG).

In the present disclosure, a transmission occasion/opportunity (TO) means a radio resource (e.g., SPS PDSCH) configured for SPS use. In a transmission occasion, a subject performing transmission (i.e., base station in case of downlink, UE in case of uplink) can attempt transmission in a TO, and a receiver (i.e., UE in case of downlink, base station in case of uplink) can expect transmission in each TO and attempt reception.

Hereinafter, in the present disclosure, an example is described based on the NR system to explain the principle of the proposed method, but the proposed methods are not specifically limited to the transmission and reception scheme of the NR unless otherwise specified. In addition, in the present disclosure, an example is described based on the characteristics and structure of the XR service to explain the principle of the proposed method, but the proposed methods are not specifically limited to supporting the XR service unless otherwise specified. Accordingly, the methods proposed in the present disclosure can be applied to all wireless communication transmission/reception structures and services as long as the principle of the proposed method is not infringed, even if there is no separate explanation.

Hereinafter, in the present disclosure, for a plurality of SPS resources configured between a UE and a base station in case a GOP pattern and jitter occur, a method a method for configuring a plurality of SPS configurations by connecting/associating them and/or a method of activating/transmitting second/secondary SPS transmission according to connected/associated first/primary SPS transmission are proposed. Through this, when a plurality of SPS configurations are connected and operated, logical channels can be mapped by dividing first/primary SPS transmission and second/secondary SPS transmission. In addition, power consumption of a UE can be prevented by determining whether the second/secondary SPS is activated and received or not received by considering a GOP pattern according to the transmission of the first/primary SPS, and it is possible to efficiently manage transmission resources by preventing unnecessary SPS transmission.

In addition, the present disclosure proposes a method of supporting different TCI states or different TRPs when one or multiple SPS configurations are configured, and a retransmission method for a plurality of SPS configurations using single DCI. Through this, when one or multiple SPS configurations are configured, different TCI states or different TRPs can be supported, and since retransmission of a plurality of SPS configurations is possible with single DCI, PDCCH overhead can be reduced and system capacity can be increased.

To this end, the method proposed in the present disclosure may include a method of allocating SPS radio resources to a UE by a base station and a method of receiving and transmitting SPS resources. In addition, the method proposed in the present disclosure may include a method of transmitting a HARQ-ACK PUCCH response for an SPS PDSCH reception result and a method of receiving retransmitted DCI of a base station through a PDCCH thereafter. In addition, the method proposed in the present disclosure may include a process in which a UE transmits a signal and a channel for informing its capability and/or service requirement, and a base station receives the signal and the channel.

As the method proposed in the present disclosure, some of the following methods may be selected and applied. In addition, each of the methods proposed in the present disclosure can be operated in an independent scheme without a combination, or one or more methods can be combined and operated in an associated scheme. Some terms, symbols, and sequences used to describe the method proposed in the present disclosure may be substituted with other terms, symbols, and sequences as long as the principles of the present disclosure are maintained.

In the present disclosure, the following SPS configuration activation/deactivation and transmission/reception operation, etc. may be supported. the following SPS configuration, activation/deactivation, transmission/reception operations, etc. can be combined with the methods proposed in this disclosure.

Figure 9:
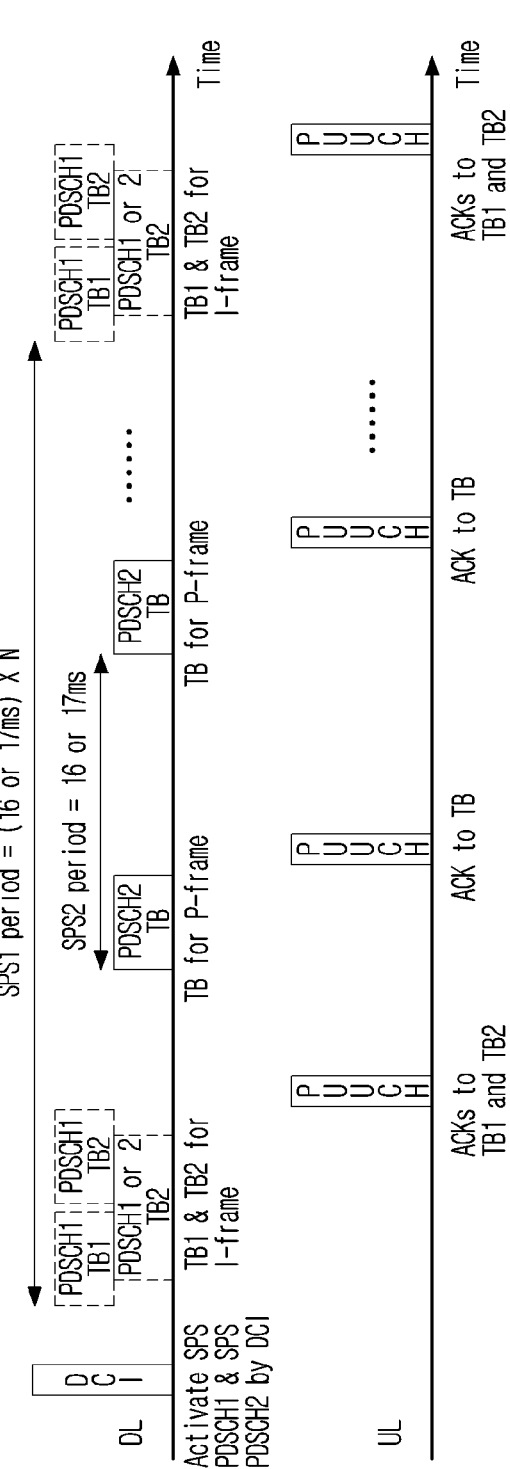
FIG. 9 illustrates a plurality of SPS configurations according to an embodiment of the present disclosure.

FIG. 9 illustrates a plurality of SPS configurations according to an embodiment of the present disclosure.

A plurality of SPSs (for example, SPS1 and SPS2 in the case of two SPSs) can be configured as one SPS group with SPS configurations connected/associated with each other, and SPS1 may be configured as a primary SPS, and SPS2 may be configured as a secondary SPS. Here, secondary SPS may be SPS activated or received according to transmission of primary SPS. For example, an SPS configuration for SPS PDSCH 1 in FIG. 9 is a primary SPS configuration, an SPS configuration for SPS PDSCH 2 is a secondary SPS configuration, and the two SPS configurations can be configured as one SPS group.

Primary SPS and secondary SPS may be configured to different SPS configuration indexes. Alternatively, primary SPS and secondary SPS are configured to the same SPS configuration index, however may be divided into primary/secondary SPS indicators or different sub-indexes by an RRC message, a MAC CE, or DCI.

i) When DCI indicates SPS1 and also indicates activation, a UE may activate SPS2 at the same time as activating SPS1 or after a predetermined time.

ii) Alternatively, when DCI indicates both SPS1 and SPS2 and also indicates activation, a UE may activate SPS2 simultaneously with activating SPS1 or after a predetermined time. For example, FIG. 9 illustrates a case in which activation is indicated for both an SPS configuration for SPS PDSCH 1 and an SPS configuration for SPS PDSCH 2 by one DCI. In addition, a case in which an SPS configuration for SPS PDSCH 1 and an SPS configuration for SPS PDSCH 2 are simultaneously activated is exemplified.

Here, DCI may include all different SPS configuration indices for SPS1 and SPS2.

Alternatively, DCI may include an SPS configuration index for SPS1 and indicate a secondary SPS indicator.

Alternatively, DCI may include an SPS configuration index for SPS2 and indicate a primary SPS indicator.

Alternatively, DCI may include an SPS configuration index for SPS1 or SPS2 and may include a sub-index for SPS2 or SPS1.

Alternatively, DCI may indicate a common SPS configuration index for SPS1 and SPS2. For example, among a HARQ process identity (ID) values indicating an SPS configuration index, a value between 1 and 8 is configured as the conventional SPS configuration index (i.e., to indicate a single SPS configuration), and a HARQ process ID value exceeding 8 may be configured as an SPS configuration index indicating a plurality of connected SPSs simultaneously.

Alternatively, DCI may include all different SPS configuration sub-indexes for SPS1 and SPS2.

A base station may configure different video frame types (e.g., I-frame and P-frame) with different logical channels. Accordingly, through s value of s logical channel identifier (LCID) field included in s sub-header of a MAC protocol data unit (PDU) (i.e., transport block (TB)), a UE can distinguish data for different video frames. Here, a base station may configure different logical channels for different video frame types to be mapped to different SPSs. Here, SPS1 and SPS2 may be mapped to the same or different logical channels.

For example, referring to FIG. 9, different logical channels may be configured/allocated to an I-frame and a P-frame. Also, a logical channel for an I-frame may be mapped to SPS for SPS PDSCH 1, and a logical channel for a P-frame may be mapped to SPS for SPS PDUSCH 2.

Activation or transmission/reception of SPS2 may be determined depending on whether SPS1 is activated or transmitted/received. Here, activation of SPS2 may be configured to occur simultaneously with or after activation of SPS1.

A UE can expect SPS2 PDSCH transmission to occur only after SPS1 PDSCH transmission. Accordingly, reception of an SPS2 PDSCH in the next period may be determined depending on whether or not an SPS1 PDSCH is received.

When an SPS1 PDSCH and an SPS2 PDSCH are transmitted/allocated by TDM or FDM in the same period or a partially overlapping period, when receiving an SPS1 PDSCH, a UE may determine that an SPS2 PDSCH resource are not available or to skip SPS2 PDSCH reception. Alternatively, a UE may deactivate SPS2 or deactivate activated SPS2. For example, as shown in FIG. 9, an SPS configuration for an SPS PDSCH 1 may be configured to a period of N times 16 ms or 17 ms (N is a natural number), and an SPS configuration for an SPS PDSCH 2 may be configured to a period of 16 ms or 17 ms. In addition, an SPS configuration for N SPS PDSCH 2 may overlap within one period of SPS configuration for an SPS PDSCH 1. That is, as shown in FIG. 9, in the first period of an SPS PDSCH 2, an SPS PDSCH 2 and an SPS PDSCH 1 may be allocated as TDM or FDM. In this case, a resource of an SPS PDSCH 2 (PDSCH 2 carrying TB2 for I-frame in FIG. 9) may be determined to be invalid or transmission of an SPS PDSCH 2 may be determined to be skipped.

When an SPS1 PDSCH and an SPS2 PDSCH are transmitted/allocated by TDM or FDM in the same slot, or when SPS1 PDSCH and SPS2 PDSCH resources overlap, a UE can prioritize SPS1 PDSCH reception regardless of an SPS configuration index of SPS1 and SPS2. That is, in this case, a UE may skip receiving an SPS2 PDSCH resource and receive and decode an SPS1 PDSCH resource. For example, as shown in FIG. 9, an SPS PDSCH 2 (PDSCH 2 carrying TB2 for I-frame in FIG. 9) may be skipped and only an SPS PDSCH 1 resource may be received.

When a HARQ-ACK (ACK/NACK, A/N or acknowledgment/negative acknowledgment) PUCCH for an SPS1 PDSCH and an A/N PUCCH for an SPS2 PDSCH are allocated to the same slot, a UE may multiplex and transmit a HARQ-ACK for an SPS1 PDSCH and a HARQ-ACK for an SPS2 PDSCH to an A/N PUCCH resource of SPS1, which is primary SPS. Alternatively, a UE may transmit a HARQ-ACK for an SPS1 PDSCH and drop a HARQ-ACK for an SPS2 PDSCH.

Alternatively, a base station and a UE may configure an A/N PUCCH resource for primary SPS, but may not configure an A/N PUCCH resource for secondary SPS.

Alternatively, an A/N PUCCH resource may be configured only for one SPS among primary SPS and secondary SPS.

Alternatively, when both primary SPS and secondary SPS are activated, and both an A/N PUCCH resources for primary SPS and an A/N PUCCH resources for secondary SPS are configured, an A/N PUCCH for secondary SPS can be invalidated. Here, when only primary SPS or only secondary SPS is activated, a HARQ-ACK may be transmitted as an A/N PUCCH resource for activated SPS.

When a base station configures and activates periodic radio resources (e.g., SPS) to a UE, the base station may allocate a plurality of radio resources to the UE within one period. In a plurality of radio resources, the same time/frequency resource allocation in a slot is repeated at regular intervals (e.g., M (M is a natural number) slot) (e.g., radio resources of 3 symbols per slot are repeatedly allocated to the same location), or radio resources having the same length may be consecutively and repeatedly allocated to consecutive symbols with the first radio resource (e.g., radio resources of 3 symbols are then repeatedly allocated). The number of radio resources N (where N is a natural number) may be determined by L1 signaling and/or higher layer signaling. For example, although FIG. 9 illustrates a case in which only one radio resource is allocated to both SPS PDSCH 1 and SPS PDSCH 2 in one period, a plurality of radio resources may be allocated in one period.

A base station/UE may perform transmission using one or a part of a plurality of SPS radio resources in the period according to a traffic pattern. Here, the fastest radio resource capable of transmitting a transport block (TB) including user data may be selected in consideration of a user data generation time of a base station/UE.

In the present disclosure, a base station may activate a plurality of SPSs connected/associated with each other through one DCI or different DCIs. Here, different SPSs may be mapped to the same or different DL cells. In addition, different SPSs may be mapped to the same or different DL bandwidth parts (BWPs). In addition, different SPSs may be mapped to the same or different resource block (RB) sets. For example, when two SPSs are connected/associated, different periodic SPS PDSCH resources for the two SPSs may be allocated to one or more DL cells, one or more DL BWPs, or one or more RB sets.

Embodiment 1: When a plurality of SPS configurations configured in a UE are connected/associated with each other, an SPS PDSCH for each SPS configuration may be transmitted and received as follows.

Here, a plurality of SPS configurations may be mapped to one or more different logical channels, or may be mapped to the same one or more logical channels, or may be mapped to partially overlapping logical channels.

When SPS1 (i.e., SPS Configuration Index 1) (i.e., sps-ConfigIndex) is mapped to a logical channel for an I-frame, SPS2 (i.e., SPS Configuration Index 2) is mapped to both a logical channel for an I-frame and a logical channel for a P-frame, and SPS1 and SPS2 are configured as connected/associated SPSs, a UE may receive different SPS PDSCHs as follows.

In this SPS configuration, a plurality of TBs for an I-frame may be transmitted through SPS PDSCHs for a plurality of SPSs. For example, as shown in FIG. 9, logical channel data for an I-frame may be divided into two TBs and transmitted through PDSCH1 for SPS1 and PDSCH2 for SPS2.

Method 1-1: A UE may determine that SPS2 resources is valid only when there is SPS1 transmission. In other words, when two connected/associated SPS configurations are configured for a UE, and when SPS PDSCH transmission for one of the SPS configurations is received (or when an ACK is transmitted for it), SPS PDSCH resources for another SPS configuration may be available. Here, invalid SPS PDSCH resources may mean that SPS PDSCH resources are not allocated.

That is, it is assumed that PDSCH resources for SPS2 are allocated according to SPS1, when a UE determines that there is SPS1 PDSCH transmission (i.e., received), or when transmitting HARQ-ACK information (e.g., ACK) for SPS PDSCH transmission for SPS1, SPS PDSCH reception for SPS2 may be determined.

Method 1-2: A UE may activate SPS2 only when there is SPS1 transmission. In other words, when two connected/associated SPS configurations are configured for a UE, when SPS PDSCH transmission for one SPS configuration is received (or when an ACK is transmitted for it), the other SPS configuration may be activated.

For example, when a base station indicates activation of both SPS1 and SPS2 with one DCI, a UE may activate SPS1 first. Thereafter, when it is determined that there is transmission of an SPS1 PDSCH or when HARQ-ACK information (e.g., ACK) for an SPS1 PDSCH is transmitted, SPS2 may be activated and an SPS2 PDSCH may be received.

Here, when it is determined that there is no SPS1 PDSCH transmission in a resource to which SPS1 PDSCH transmission is allocated, or when it is determined that there is no SPS1 PDSCH transmission for a certain period of time, or when a NACK is transmitted for SPS1 PDSCH transmission, a UE may determine that SPS2 is deactivated (or may deactivate activated SPS2).

If necessary, even if a base station has already indicated activation of both SPS1 and SPS2 as first DCI, a base station may indicate activation/release of SPS2 as separate second DCI. When two DCIs (first DCI and second DCI) activate the same SPS2, even if SPS2 has already been activated, a UE can activate SPS2 again according to the last received DCI (i.e., second DCI).

Method 1-3: A UE may determine whether to receive an SPS2 PDSCH according to a MAC PDU header or a MAC CE content received through an SPS1 PDSCH. In other words, when two connected/associated SPS configurations are configured for a UE, whether or not to receive an SPS PDSCH for another SPS configuration may be determined according to contents of SPS PDSCH transmission for one SPS configuration. Here, determining whether or not to receive an SPS PDSCH may mean whether SPS PDSCH resources for a corresponding SPS configuration are allocated (i.e., whether it is valid) or whether a corresponding SPS configuration is activated.

For example, an LCID field or a MAC CE of a MAC PDU received through an SPS1 PDSCH may inform (indicate) a start of a GOP pattern, a logical channel corresponding to an I-frame, or connected SPS2 transmission or activation. In this case, a UE may activate deactivated SPS2 and receive an activated SPS2 PDSCH.

Embodiment 2: When a plurality of SPS configurations configured in a UE are connected/associated with each other, an SPS PDSCH for each SPS configuration may be transmitted and received as follows.

Here, a plurality of SPS configurations may be mapped to one or more different logical channels, or may be mapped to the same one or more logical channels, or may be mapped to partially overlapping logical channels.

When, SPS1 (i.e., SPS Configuration Index 1) is mapped to a logical channel for an I-frame, SPS2 (i.e., SPS Configuration Index 2) is mapped to a logical channel for P-frame, and SPS1 and SPS2 are configured as connected/ associated SPSs, a UE can receive different SPSs as follows.

In this SPS configuration, a plurality of TBs for an I-frame may be transmitted through a plurality of SPS PDSCHs for SPS1. For example, as shown in FIG. 9, logical channel data for an I-frame may be divided into two TBs and transmitted through different (consecutive) PDSCH1s for SPS1.

Method 2-1: SPS PDSCH resources may not be allocated to a specific (one or more) SPS period of SPS2. In other words, when two connected/associated SPS configurations are configured for a UE, SPS PDSCH resources may not be allocated (may be invalid) within one or more specific periods of a specific SPS configuration.

For example, a UE may determine that SPS PDSCH resources allocated to a specific (one or more) SPS period of SPS2 overlapping with SPS1 PDSCH transmission are invalid. And/or, a base station may not allocate SPS PDSCH resources to a specific (one or more) SPS period of SPS2 overlapping with SPS1 PDSCH transmission.

In this method, in order to invalidate or not allocate SPS PDSCH resources of a specific M-th (or one or more) overlapping SPS periods, a mask (i.e., a period in which an SPS PDSCH is not transmitted) may be configured in units of SPS periods. Accordingly, a UE and a base station may invalidate or not allocate SPS PDSCH resources of a specific M-th (or one or more) SPS periods for which a mask is configured.

Method 2-2: SPS2 transmission may be skipped in a (one or more) SPS2 period overlapping SPS1. In other words, when two connected/associated SPS configurations are configured for a UE, SPS PDSCH transmission may be skipped within one or more specific periods of a specific SPS configuration that overlaps with the other SPS configuration. That is, SPS PDSCH resources are allocated in one or more corresponding periods, but SPS PDSCH transmission may be skipped.

A UE may skip PDSCH reception allocated to a specific (one or more) SPS period of SPS2 overlapping with SPS1 PDSCH transmission.

In this method, in order to skip a specific M-th (or one or more) overlapping SPS period, a mask may be configured in units of SPS periods. Accordingly, a UE and a base station may skip SPS PDSCH reception/transmission of a specific M-th (or one or more) SPS period for which a mask is configured.

Here, an ACK may be transmitted as HARQ-ACK information for a skipped SPS PDSCH. Alternatively, a response of HARQ-ACK information for a skipped SPS PDSCH may also be skipped.

Method 2-3: When SPS1 PDSCH transmission is detected in a specific SPS1 period, or when an SPS1 PDSCH is received in a specific SPS1 period, SPS2 PDSCH resource (s) of SPS2 period(s) starting after SPS1 PDSCH transmission/reception may be determined to be valid. Accordingly, a UE can receive SPS2 PDSCH transmission(s) on corresponding valid SPS2 PDSCH resource(s). In other words, when two connected/associated SPS configurations are configured for a UE, if an SPS PDSCH for one SPS configuration is transmitted, an SPS PDSCH may be transmitted within one or more periods for another SPS configuration that starts after transmission of the corresponding SPS PDSCH.

Here, a UE may determine that A/N PUCCH resource(s) are effectively allocated only for SPS2 PDSCH resource(s) of SPS2 period(s) starting after SPS1 PDSCH transmission/reception.

Alternatively, a UE may determine that all A/N PUCCH resources of all SPS2 periods starting after transmission/reception of an SPS1 PDSCH are effectively allocated. In this case, a UE may transmit an ACK for invalid SPS2 PDSCH transmission.

Embodiment 3: When a plurality of SPS configurations configured in a UE are connected/associated with each other, SPS PDSCH transmission for other SPS configurations may be indicated through SPS PDSCH transmission for one SPS configuration.

Here, a plurality of SPS configurations may be mapped to one or more different logical channels, or may be mapped to the same one or more logical channels, or may be mapped to partially overlapping logical channels.

When SPS1 (i.e., SPS Configuration Index 1) is mapped to a logical channel for an I-frame, SPS2 (i.e., SPS Configuration Index 2) is mapped to a logical channel for a P-frame, and SPS1 and SPS2 are configured as connected/ associated SPSs, a UE may activate all connected/associated SPSs according to DCI, and transmission of SPS1 PDSCH(s) or SPS2 PDSCH(s) of period N+k (K is a natural number) may be indicated through transmission of an SPS1 PDSCH of period N (N is a natural number).

In other words, when two connected/associated SPS configurations are configured for a UE, through SPS PDSCH transmission in a specific period of a specific SPS configuration, SPS PDSCH transmission in one or more periods for the corresponding SPS configuration and/or the other SPS configuration may be indicated thereafter.

For example, through a sub-header or a MAC CE of an SPS1 PDSCH of period N, a start of a GOP pattern may be informed, a logical channel corresponding to an I-frame may be indicated, or reception or activation of connected SPS2 may be indicated. In this case, a UE may expect and receive SPS2 PDSCH transmission during the k-th period (k=1, 2, 3, . . . ) immediately after receiving an SPS1 PDSCH.

Here, a UE may expect and receive a plurality of SPS2 PDSCH transmissions following the k-th period. For example, if three P-frames are expected to be transmitted right after an I-frame according to information notified by a base station, a UE can expect and receive SPS PDSCH transmission during the k, k+1, k+2-th periods (k=1, 2, 3, . . . , M) immediately after SPS1 PDSCH transmission.

In addition, a UE may receive information on a GOP pattern through an RRC message, a MAC CE or a DCI for configuring or activating SPS1 and SPS2.

Alternatively, a MAC CE of an SPS1 PDSCH of period N may indicate a GOP pattern. For example, transmission of three P-frames immediately after an I-frame may be indicated. In this case, a UE may expect and receive SPS PDSCH transmission during the k, k+1, and k+2-th periods (k=1, 2, 3, . . . ) immediately after SPS1 PDSCH transmission.

Embodiment 4: When a plurality of SPS configurations configured in a UE are connected/associated with each other, retransmission of an SPS PDSCH for the plurality of SPS configurations may be performed as follows.

Here, a plurality of SPS configurations may be mapped to one or more different logical channels, or may be mapped to the same one or more logical channels, or may be mapped to some overlapping logical channels.

For a TB of an SPS1 (i.e., SPS Configuration Index 1) PDSCH and a TB of an SPS2 (i.e., SPS Configuration Index 2) PDSCH, when a UE transmits all NACKs in one PUCCH resource or all NACKs in two adjacent (e.g., within a predetermined distance) PUCCH resources, a base station can schedule two TDMed and/or FDMed PDSCH transmissions for two TBs of the SPS1 PDSCH and the SPS2 PDSCH with one DCI.

Here, when a common HARQ process ID value indicating an SPS Configuration Index (e.g., SPS-ConfigIndex) of an SPS1 PDSCH and an SPS Configuration Index (e.g., SPS-ConfigIndex) of an SPS2 PDSCH is configured, the DCI may indicate the common HARQ process ID value.

Alternatively, when individual HARQ process ID values indicating an SPS Configuration Index (e.g., SPS-Config-Index) of an SPS1 PDSCH and an SPS Configuration Index (e.g., SPS-ConfigIndex) of an SPS2 PDSCH are configured, the DCI may indicate HARQ process ID values indicating the SPS Configuration Index of the SPS1 PDSCH and the SPS Configuration Index of the SPS2 PDSCH, respectively. Here, each HARQ process ID value may be the same or different.

Meanwhile, when SPS1 and SPS2 are transmitted to different cells, the DCI may indicate cell index values indicating a serving cell of an SPS1 PDSCH and a serving cell of an SPS2 PDSCH, respectively. Alternatively, a plurality of SPSs of different cells may be configured to have the same or different SPS Configuration Index (e.g., SPS-ConfigIndex) values, and DCI (for retransmission indication) may indicate HARQ process IDs mapped to the same or different SPS Configuration Index (e.g., SPS-ConfigIndex) values.

Here, a CS-RNTI for scrambling a CRC of DCI (for retransmission indication) or a separate M-CS-RNTI for retransmission of the plurality of SPSs may be configured.

In addition, a base station may configure a separate search space having a separate search space ID for DCI (for retransmission indication). In this case, only when one or both of the SPSs (for example, SPS1 and SPS2) are activated, a UE can monitor a PDCCH in the separate search space. For example, this search space may be a separate search space for data scheduling of a logical channel for XR. In this case, a corresponding search space may be configured to be used for SPS retransmission for XR, SPS retransmission, or dynamic UL/DL scheduling resource allocation.

Embodiment 5: When a plurality of SPS configurations configured for a UE are connected/associated with each other, an SPS PDSCH for each SPS configuration may be transmitted and received as follows.

Here, a plurality of SPS configurations may be mapped to one or more different logical channels, or may be mapped to the same one or more logical channels, or may be mapped to partially overlapping logical channels.

When an SPS1 (i.e., SPS Configuration Index 1) PDSCH and an SPS2 (i.e., SPS Configuration Index 2) PDSCH are allocated to the same slot or time and/or frequency resources of an SPS 1 PDSCH and an SPS2 PDSCH partially or entirely overlap, a base station and a UE may determine that the SPS1 PDSCH and the SPS2 PDSCH are switched to one or two SPS PDSCH resources.

For example, it may be assumed that one of a plurality of PDSCHs is switched to one SPS PDSCH having the largest resource or switched to one SPS PDSCH by combining two PDSCH resources in time and frequency. In this case, a UE can receive only one SPS PDSCH. In other words, a UE may receive an SPS PDSCH only on one SPS PDSCH resource having the largest resource among two PDSCHs for an SPS1 configuration and an SPS2 configuration (i.e., only receive data for a logical channel mapped with a corresponding SPS configuration) and skip SPS PDSCH reception on the remaining SPS PDSCH resource. Alternatively, a UE may receive an SPS PDSCH by combining a plurality of PDSCH resources and considering them as one SPS PDSCH resource (i.e., data for both logical channels mapped to two SPS1 configurations are received, or data for a logical channel mapped to only one SPS configuration are received).

Here, a base station and a UE may assume that one combined SPS PDSCH is a primary SPS or an SPS of a lower SPS configuration index (e.g., SPS-ConfigIndex), and a HARQ-ACK of the combined SPS PDSCH may be transmitted through an A/N PUCCH resource of SPS. In addition, DCI (to indicate retransmission) may allocate an SPS retransmission resource by indicating an SPS configuration index of the primary SPS or the lower SPS configuration index.

In addition, overlapping symbols and/or physical resource blocks (PRBs) in SPS1 PDSCH resources and SPS2 PDSCH resources are divided equally or in a specific ratio, and the divided resources may be allocated as adjacent non-overlapping SPS1 PDSCH resources and SPS2 PDSCH resources, respectively, so that SPS1 PDSCH resources and SPS2 PDSCH resources may be reconstructed. In this case, a UE may receive two SPS PDSCHs through the reconfigured SPS1 PDSCH resources and SPS2 PDSCH resources.

Here, in the reconstructed SPS1 PDSCH and SPS2 PDSCH, an earlier SPS PDSCH may be designated as SPS1 or SPS2 based on a start symbol or an end symbol, and the remaining SPS PDSCH may be designated as SPS2 or SPS1. Alternatively, (in case of the same start or end symbol) in the reconfigured SPS1 PDSCH and SPS2 PDSCH, a lower SPS PDSCH may be designated as SPS1 or SPS2 based on the lowest PRB or highest PRB, and the remaining SPS PDSCH may be designated as SPS2 or SPS1.

Embodiment 6: When a plurality of SPS configurations configured for a UE are connected/associated with each other, an SPS PDSCH for each SPS configuration may be transmitted and received as follows.

When SPS1 (i.e., SPS Configuration Index 1) and SPS2 (i.e., SPS Configuration Index 2) are connected/linked, SPS2 (i.e., SPS having a shorter period) may be always designated/configured as LP. SPS1 (e.g., an SPS having a longer period) may be configured as LP or HP, and if there is no configuration for priority, it may be assumed to be LP. Alternatively, when SPS1 and SPS2 are connected/associated, SPS2 (e.g., an SPS having a shorter period) may always be designated/configured as HP. Alternatively, SPS1 (e . . . ,. an SPS having a longer period) may be designated as priority for XR, and SPS2 (e.g., an SPS having a shorter period) may be designated as an LP. Alternatively, both connected/associated SPS1 and SPS2 may be designated as priority for XR.

In this case, when an SPS1 PDSCH and another SPS PDSCH or SPS2 PDSCH partially or completely overlap each other in a frequency and/or time domain, a UE may preferentially receive the SPS1 PDSCH, which is HP. In addition, a UE may skip reception of the SPS PDSCH for the remaining SPS2.

In addition, priority of HARQ-ACK for an SPS1 PDSCH may be determined according to priority of SPS1, and priority of HARQ-ACK for an SPS2 PDSCH may be determined according to priority of SPS2. Based on this priority, a PUCCH for a corresponding HARQ-ACK may be multiplexed with other UCI.

Embodiment 7: When one SPS configuration is configured for a UE, an SPS PDSCH for the corresponding SPS configuration may be transmitted and received as follows.

For one specific SPS (e.g., SPS1), TDM PDSCH occasions (i.e., TOs) or FDM PDSCH occasions (i.e., TOs) may be configured in one SPS period, and repeated M-TRP transmission of a PDSCH of the same TB or multiple transmission of a PDSCH of different TBs may be supported. Here, another SPS (e.g., SPS2) is configured with only one PDSCH occasion (i.e., TO) or a plurality of PDSCH occasions (i.e., TOs) mapped to a single TRP, SPS1 and SPS2 may be connected/associated with each other.

For TDM PDSCH transmission, when a plurality of PDSCH resources are allocated in a conventional PDSCH repetition scheme, multiple TBs can be transmitted using different PDSCH resources instead of repetition of the same TB. Here, slot-based PDSCHs may be arranged/allocated for each different slot and transmitted, or sub-slot-based PDSCHs may be arranged/assigned to one or a plurality of slots and transmitted.

For FDM PDSCH transmission, a plurality of PDSCH resources may be allocated by FDM in the same slot of the same period. For example, different TBs of short packet data budget (PDB) or different TBs for an I-frame may be configured to transmit in the same slot with FDM.

When a base station configures multiple FDM PDSCH transmissions for specific SPS in which multiple SPS PDSCH transmissions are configured within one SPS period, a UE can expect FDM PDSCHs within the same SPS period. In this case, if there is no configuration for transmission of multiple FDM PDSCHs, a UE can expect reception of TDM PDSCHs within the same SPS period. Alternatively, if there is no explicit configuration of a base station, a UE may be defined/configured to blindly detect whether FDM PDSCH transmission or TDM PDSCH transmission is performed within one SPS period for a specific SPS.

M (M is a natural number) TBs may be transmitted for TDM SPS PDSCH or FDM SPS PDSCH resources repeated N times in one period. Here, PDSCH resources within one period are grouped into N/M TDM PDSCH sets or FDM PDSCH sets, and one TB may be repeatedly transmitted in one TDM or FDM PDSCH set. For example, when 4 PDSCH resources are allocated to one SPS period, the first two TDMed or FDMed SPS PDSCH resources and the next two TDMed or FDMed SPS PDSCH resources may be configured to different SPS PDSCH sets, different TBs may be transmitted through different PDSCH sets. Here, TDM or FDM may be performed between different PDSCH sets.

Here, FDM SPS PDSCH resources or FDM SPS PDSCH sets may be allocated to the same or different DL BWPs or to the same or different DL cells.

In addition, PDSCHs belonging to the same SPS PDSCH set are configured to the same time/frequency resource size, but PDSCHs belonging to different PDSCH sets may be configured to different time/frequency resource sizes.

For example, in FIG. 9, two PDSCHIs for SPS1 may be transmitted in the same SPS period, and different TBs may be transmitted.

In addition, different PDSCH sets within the same SPS period may be mapped to different HARQ process IDs, and different PDSCHs belonging to the same PDSCH set may be mapped to the same HARQ process ID.

For example, HARQ process ID1 for a first SPS PDSCH set may be determined according to Equation 6 below, and HARQ process ID2 for a second SPS PDSCH set in the same SPS period may be determined by HARQ process ID1 of a first SPS PDSCH set+the number of HARQ processes (nrofHARQ-Processes) (see Equation 7) or HARQ process ID1 of a first SPS PDSCH set+offset (see Equation 8).

$$HARQ \text{ Process } ID1 = \left[ \text{floor} \left( \text{CURRENT\_slot} \times \right. \right. \tag{Equation 6}$$
$$\left. \left. 10/(numberOfSlotsPerFrame \times periodicity) \right) \right]$$
$$\text{modulo } nrofHARQ - \text{Processes} + harq - ProcID-\text{Offset}$$

In Equation 6, CURRENT_slot=[(SFN×numberOfSlotsPerFrame)+slot number in the frame]. numberOfSlotsPerFrame means the number of consecutive slots per frame.

HARQ process ID2 of a second SPS PDSCH set may be determined according to Equation 7 or Equation 8 below.

$$HARQ \text{ Process } ID2 = \tag{Equation 7}$$
$$HARQ \text{ Process } ID1 + nrofHARQ - \text{Processes}$$

$$HARQ \text{ Process } ID2 = \tag{Equation 8}$$
$$HARQ \text{ Process } ID1 + harq - ProcID - Set2 - \text{Offset}$$

In Equation 8, an offset (harq-ProcID-Set2-Offset) may be configured by a base station through an RRC message or activation DCI.

In addition, according to a configuration of a base station, different SPS PDSCH sets for a UE may be configured to be mapped to different TRP and TCI states. In addition, the same TB may be repeatedly transmitted from multiple TRPs through different SPS PDSCH sets. In this case, DMRSs of different PDSCH sets may be QCLed and transmitted in different TCI states.

For example, in FIG. 9, two PDSCHIs for SPS1 are transmitted in the same SPS period, but may be configured to transmit the same TB. Here, different PDSCHIs are mapped to the same or different TCI states so that the same TB can be repeatedly transmitted. Here, different PDSCH sets of the same period may have the same HARQ process ID value.

Meanwhile, when the same TB is transmitted through a first SPS PDSCH set and a second SPS PDSCH set, PUCCH resources for transmitting HARQ-ACK information for the first SPS PDSCH set and the second SPS PDSCH set may be configured/determined as the same resource or individually configured/determined as different resources.

In addition, when different TBs are transmitted through a first SPS PDSCH set and a second SPS PDSCH set, PUCCH resources for transmitting HARQ-ACK information for each SPS PDSCH set may be individually configured/determined. Here, each PUCCH resource may be transmitted by applying a TCI state for a mapped/associated SPS PDSCH set. That is, an uplink transmission spatial filter in a corresponding PUCCH resource may be determined based on a TCI state for an associated/mapped SPS PDSCH set.

Embodiment 8: When a plurality of SPS configurations configured for a UE are connected/associated with each other, an SPS PDSCH for each SPS configuration may be transmitted and received as follows.

Here, a plurality of SPS configurations may be mapped to one or more different logical channels, or may be mapped to the same one or more logical channels, or may be mapped to partially overlapping logical channels.

SPS1 (i.e., SPS Configuration Index 1) and SPS2 (i.e., SPS Configuration Index 2) may be mapped to different TCI states, and SPS1 PDSCH resources and SPS2 PDSCH resources may be configured to be TDM or FDM in the same slot.

A base station may inform a UE of information on which different TCI states are mapped for different SPS Configuration Indexes (e.g., SPS-ConfigIndex) through RRC signaling and/or MAC CE. For example, information on a TCI state mapped in SPS configuration information (e.g., SPS-Config IE, see Table 6) for each SPS Configuration Index may be included.

If TCI states for an SPS1 PDSCH and an SPS2 PDSCH are changed respectively (i.e., activation and/or inactivation of a TCI stat) through a MAC CE, etc., the MAC CE may indicate a TCI state mapped for each SPS Configuration Index (e.g., SPS-ConfigIndex) for two activated SPS Configuration Indexes (e.g., SPS-ConfigIndex). A UE may activate or deactivate an indicated TCI state for each indicated SPS Configuration Index (e.g., SPS-ConfigIndex) according to a received MAC CE. A UE may apply an indicated (i.e., changed) TCI state for SPS PDSCH reception of the first SPS period after a time when a received MAC CE is completed or after a time when HARQ-ACK information (e.g., ACK) is transmitted for a received MAC CE.

In addition, an SPS1 period and an SPS2 period may be configured to align (and may be configured to the same period). Here, a UE may receive the same TB in different TCI states through an SPS1 PDSCH of an SPS1 period and an SPS2 PDSCH of an SPS2 period which are aligned. Here, a UE may receive the same TB from different TRPs through SPS1 and SPS2.

Meanwhile, when the same TB is transmitted through an SPS1 configuration and an SPS2 configuration, PUCCH resources for transmitting HARQ-ACK information for an SPS PDSCH for an SPS1 configuration and an SPS PDSCH for an SPS2 configuration may be configured/determined as the same resource or individually configured/determined as different resources.

In addition, when different TBs are transmitted through the SPS1 configuration and the SPS2 configuration, PUCCH resources for transmitting HARQ-ACK information for the SPS PDSCH for each SPS configuration may be individually configured/determined. Here, each PUCCH resource may be transmitted by applying a TCI state for an SPS PDSCH of a mapping/associated SPS configuration. That is, an uplink transmission spatial filter in a corresponding PUCCH resource may be determined based on a TCI state for an associated/mapped SPS PDSCH.

Figure 10:
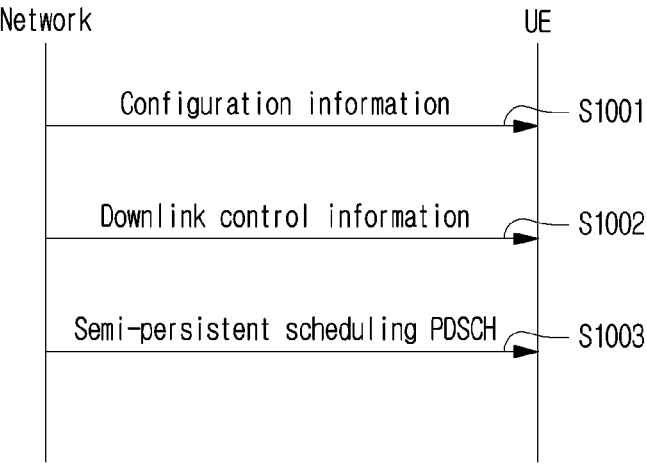
FIG. 10 illustrates a signaling procedure between a network and a UE for a method for transmitting and receiving a semi-persistent scheduling PDSCH according to an embodiment of the present disclosure.

FIG. 10 illustrates a signaling procedure between a network and a UE for a method for transmitting and receiving a semi-persistent scheduling PDSCH according to an embodiment of the present disclosure.

FIG. 10 exemplifies a signaling procedure between a network (e.g., TRP 1, TRP 2) and a terminal (i.e., UE) in a situation of multiple TRP (i.e., M-TRP, or multiple cells, hereinafter all TRP may be substituted with cells) to which the methods (e.g., Embodiments 1to 8 and a combination of one or more proposed methods in Embodiments 1 to 8) proposed in the present disclosure may be applied. FIG. 10 is only for convenience of description and does not limit the scope of the present disclosure. In addition, some step(s) illustrated in FIG. 10 may be omitted depending on circumstances and/or settings.

The signaling scheme described in FIG. 10 may be extended and applied to signaling between multiple TRPs and multiple UEs. In the following description, a network may be one base station including a plurality of TRPs or may be one cell including a plurality of TRPs. In an example, ideal/non-ideal backhaul may be configured between TRP 1 and TRP 2 included in a network. In addition, the following description is described based on a plurality of TRPs, but it may be also equivalently extended and applied to transmission through a plurality of panels. In addition, in the present disclosure, an operation in which a terminal receives a signal from TRP1/TRP2 may be interpreted/explained (or may be an operation) as an operation in which a terminal receives a signal from a network (via/using TRP1/2), and an operation in which a terminal transmits a signal to TRP1/TRP2 may be interpreted/explained (or may be an operation) as an operation in which a terminal transmits a signal to a network (via/using TRP1/TRP2), and vice versa.

A base station may mean a generic term for an object that transmits and receives data to and from a UE. For example, a base station may be a concept including one or more transmission points (TPs), one or more transmission and reception points (TRPs), etc. Also, a TP and/or a TRP may include a panel of a base station, a transmission and reception unit, etc. In addition, "TRP" may be substituted with an expression such as a panel, an antenna array, a cell (e.g., macro cell/small cell/pico cell, etc.), TP (transmission point), a base station (base station, gNB, etc.), etc. and applied. As described above, TRPs may be classified according to information (e.g., index, ID) on a CORESET group (or CORESET pool). For example, when one UE is configured to transmit/receive with multiple TRPs (or cells), this may mean that multiple CORESET groups (or CORESET pools) are configured for one UE. Configuration of such a CORESET group (or CORESET pool) may be performed through higher layer signaling (e.g., RRC signaling, etc.).

A UE may receive configuration information from a network through/using TRP 1 (and/or TRP 2) (S1001).

The configuration information may include information related to network configuration (e.g., TRP configuration)/information related to transmission/reception based on M-TRP (e.g., resource allocation, etc.), etc. In this case, the configuration information may be transmitted through higher layer signaling (e.g., RRC signaling, MAC-CE, etc.).

The configuration information may include configuration information related to an SPS configuration described in the above-described proposed methods (e.g., Embodiments 1 to 8 and a combination of one or more proposed methods in Embodiments 1 to 8). For example, one or more SPS configurations may be configured for a UE, and the configuration information may include respective configuration information (e.g., SPS-Config IE) for each of one or more SPS configurations. Here, the respective configuration information for each of the one or more SPS configurations may include information/parameters exemplified in Table 6 above.

In addition, for example, the configuration information may include information for configuring a joint TCI and/or separate DL/UL TCI. For example, the configuration information may provide a reference signal for QCL for a DMRS/downlink signal (e.g., CSI-RS) of a downlink channel (e.g., PDSCH, PDCCH), and/or may include a list of TCI states providing reference for determining an uplink transmission spatial filter of a DMRS/uplink signal (e.g., SRS) of an uplink channel (e.g., PUSCH, PUCCH).

In addition, for example, respective configuration information for each SPS configuration according to the above-described Embodiment may include information on a logical channel associated with the corresponding SPS configuration.

In addition, respective configuration information for each SPS configuration according to the above-described Embodiment may include information on a TCI state for the corresponding SPS configuration. Here, a TCI state for a corresponding SPS configuration may be configured/indicated within the above-described list of TCI states.

Meanwhile, although not shown in FIG. 10, a UE may receive a MAC CE for activating and/or deactivating a downlink (or joint) TCI state (i.e., activation command) via/using TRP 1 (and/or TRP 2) from a network. The MAC CE may indicate activation and/or deactivation of one or more TCI states (i.e., one or more TCI states in a TCI state list) for a downlink channel/signal, and may be used to map one TCI state for a downlink channel/signal (i.e., a TCI state in a TCI state list) to a codepoint of a TCI field in DCI.

A UE may receive downlink control information through/using TRP 1 (and/or TRP 2) from a network (S1002).

Here, downlink control information (DCI) may be transmitted through a PDCCH and may be used to trigger activation/release of a specific SPS configuration among one or more SPS configurations configured for a UE. In addition, DCI may provide additional information to resource allocation information provided in the configuration information (e.g., SPS-Config IE). In addition, DCI may include resource allocation information for an SPS PDSCH for retransmission when retransmission of the SPS PDSCH for an activated SPS configuration is requested from a UE.

In addition, one or more SPS configurations may be activated for a UE, and in this case, a UE may receive respective activation DCI for one or more SPS configurations from a network.

In addition, a TCI state for one or more SPS configurations configured for a UE may be configured by configuration information (e.g., SPS-Config IE) related to the SPS configuration, or may be configured/indicated the MAC CE described above or indicated by activation DCI.

A UE receives an SPS PDSCH via/using TRP 1 (and/or TRP 2) from a network (S1003).

Here, a UE may receive an SPS PDSCH from a network based on an operation described in the above proposed methods (e.g., Embodiments 1 to 8 and a combination of one or more proposed methods in Embodiments 1 to 8).

For example, according to the Embodiment 1, when a plurality of SPS configurations configured for a UE are connected/associated with each other, the UE may determine that resources for other SPS configurations are valid or that other SPS configurations are activated, only when there is reception of a specific SPS configuration. In addition, a UE may determine whether to receive an SPS PDSCH for other SPS through an SPS PDSCH for the specific SPS.

In addition, for example, according to the Embodiment 2, when a plurality of SPS configurations configured for a UE are connected/associated with each other, in an SPS PDSCH period for an SPS2 configuration that overlaps with an SPS1 configuration, an SPS PDSCH resource for SPS2 may not be allocated, and a UE may skip SPS PDSCH reception.

In addition, for example, when a plurality of SPS configurations configured for a UE are connected/associated with each other according to the Embodiment 3, SPS PDSCH reception for other SPS configurations may be indicated through SPS PDSCH reception for one SPS configuration.

In addition, for example, according to the Embodiment 5, when a plurality of SPS configurations configured for a UE are connected/associated with each other, if time and/or frequency resources of an SPS1 PDSCH and an SPS2 PDSCH partially or entirely overlap, the SPS1 PDSCH and the SPS2 PDSCH may be switched/reconfigured into one or two SPS PDSCH resources.

In addition, for example, according to the Embodiment 6, when a plurality of SPS configurations configured for a UE are connected/associated with each other, a priority for each SPS configuration may be configured, and a UE may perform SPS PDSCH reception in consideration of the priority for each SPS configuration.

In addition, for example, according to the Embodiment 7, a plurality of SPS PDSCH resources within one SPS PDSCH period for one SPS configuration may be divided into a plurality of SPS PDSCH resource sets (i.e., a first SPS PDSCH resource set and a second SPS PDUSCH resource set). And, in each SPS PDSCH resource set, the same or different TBs may be received through an SPS PDSCH. Here, different TCI states may be configured/indicated for each SPS PDSCH resource set, and a reference signal for QCL for a DMRS of an SPS PDSCH in each SPS PDSCH resource set may be provided by a TCI state for a corresponding SPS PDSCH resource set.

In addition, for example, according to the Embodiment 8, a plurality of SPS PDSCH resources within the same SPS PDSCH period for different SPS configurations may be divided into a plurality of SPS PDSCH resource sets (i.e., a first SPS PDSCH resource set and a second SPS PDUSCH resource set). In this case, for example, each SPS PDSCH resource set may correspond to each SPS configuration. In other words, each SPS configuration may mean each SPS PDSCH resource set. And, in each SPS PDSCH resource set, the same or different TBs may be received through an SPS PDSCH. Here, different TCI states may be configured/indicated for each SPS PDSCH resource set, and a reference signal for QCL for a DMRS of an SPS PDSCH in each SPS PDSCH resource set may be provided by a TCI state for a corresponding SPS PDSCH resource set.

Meanwhile, for example, when a plurality of SPS configurations configured for a UE are connected/associated with each other, after the UE receives an SPS PDSCH for an SPS1 configuration and an SPS PDSCH for an SPS2 configuration according to other embodiments, retransmission of the SPS PDSCH for the plurality of SPS configurations may be indicated through one DCI according to the Embodiment 4.

Figure 11:
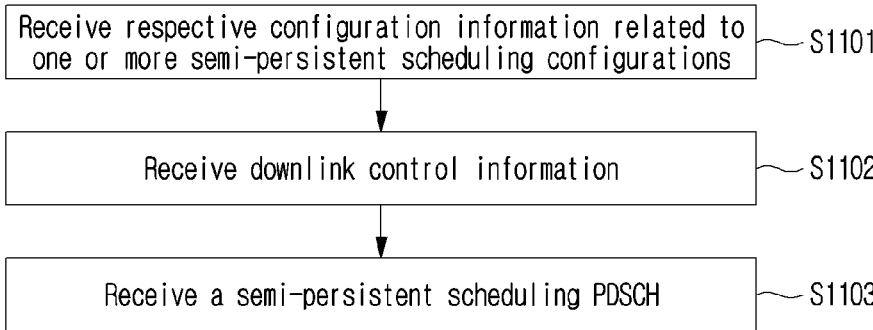
FIG. 11 is a diagram illustrating an operation of a UE for a method for transmitting and receiving a semi-persistent scheduling PDSCH according to an embodiment of the present disclosure.

FIG. 11 is a diagram illustrating an operation of a UE for a method for transmitting and receiving a semi-persistent scheduling PDSCH according to an embodiment of the present disclosure.

Referring to FIG. 11, FIG. 11 exemplifies an operation of a UE based on the proposed methods (e.g., Embodiments 1 to 8 and a combination of one or more proposed methods in Embodiments 1 to 8). FIG. 11 is only for convenience of description, but it is not intended to limit a scope of the present disclosure. Some step(s) shown in FIG. 11 may be omitted according to situations and/or configurations, etc. In addition, a UE in FIG. 11 is only one example, and may be implemented as an apparatus illustrated in FIG. 13. For example, a processor (102/202) of FIG. 13 may control to transmit and receive channel/signal/data/information, etc. by using a transceiver (106/206), and control to store transmitted or received channel/signal/data/information in a memory (104/204).

Figure 13:
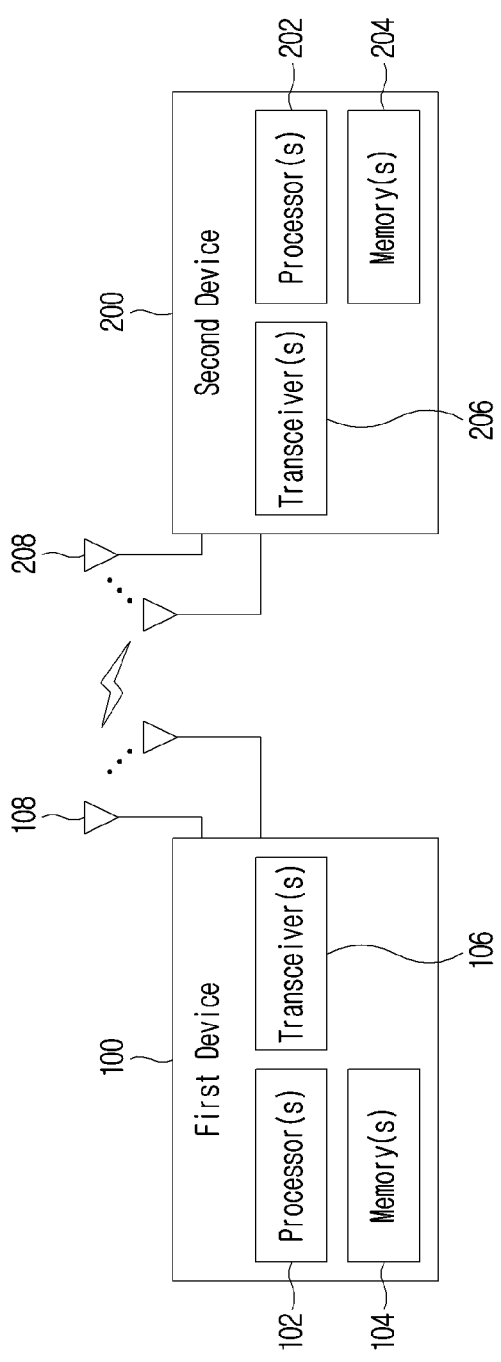
FIG. 13 illustrates a block diagram of a wireless communication device according to an embodiment of the present disclosure.

In addition, an operation of FIG. 11 may be processed by one or more processors (102, 202) of FIG. 13. In addition, an operation of FIG. 11 may be stored in a memory (e.g., one or more memories (104, 204) of FIG. 13) in a form of an instruction/program (e.g., instruction, executable code) for driving at least one processor (e.g., 102, 202) of FIG. 13.

A UE receives respective configuration information related to one or more semi-persistent scheduling (SPS) configurations (through/using TRP 1 (and/or TRP 2)) from a base station (S1101).

The configuration information related the SPS configuration may include configuration information related to an SPS configuration described in the above-described proposed methods (e.g., Embodiments 1 to 8 and a combination of one or more proposed methods in Embodiments 1 to 8). For example, one or more SPS configurations may be configured for a UE, and respective configuration information (e.g., SPS-Config IE) for each of one or more SPS configurations may include information/parameters exemplified in Table 6 above.

In addition, although not shown in FIG. 11, a UE may receive configuration information for a configuration of a joint TCI and/or a separate DL/UL TCI (via/with TRP 1 (and/or TRP 2)) from a base station. For example, the configuration information may provide a reference signal for QCL for a DMRS/downlink signal (e.g., CSI-RS) of a downlink channel (e.g., PDSCH, PDCCH), and/or may include a list of TCI states providing reference for determining an uplink transmission spatial filter of a DMRS/uplink signal (e.g., SRS) of an uplink channel (e.g., PUSCH, PUCCH).

In addition, for example, respective configuration information for each SPS configuration according to the above-described Embodiment may include information on a logical channel associated with the corresponding SPS configuration.

In addition, respective configuration information for each SPS configuration according to the above-described Embodiment may include information on a TCI state for the corresponding SPS configuration. Here, a TCI state for a corresponding SPS configuration may be configured/indicated within the above-described list of TCI states.

Meanwhile, although not shown in FIG. 11, a UE may receive a MAC CE for activating and/or deactivating a downlink (or joint) TCI state (i.e., activation command) via/using TRP 1 (and/or TRP 2) from a base station. The MAC CE may indicate activation and/or deactivation of one or more TCI states (i.e., one or more TCI states in a TCI state list) for a downlink channel/signal, and may be used to map one TCI state for a downlink channel/signal (i.e., a TCI state in a TCI state list) to a codepoint of a TCI field in DCI.

For example, according to the Embodiment 8, a UE may receive a single MAC CE for activation and/or deactivation of a TCI state for a first SPS PDSCH resource set (e.g., a first SPS configuration) and a second SPS PDSCH resource set (e.g., a second SPS configuration) (via/using TRP 1 (and/or TRP 2)) from a base station. In this case, a TCI state indicated by the MAC CE may be activated and/or deactivated from the first SPS PDSCH period after the UE receives the MAC CE or the UE transmits an ACK for the MAC CE.

A UE receives downlink control information (through/using TRP 1 (and/or TRP 2)) from a base station (S1102).

Here, downlink control information (DCI) may be transmitted through a PDCCH and may be used to trigger activation/release of a specific SPS configuration among one or more SPS configurations configured for a UE. In addition, DCI may provide additional information to resource allocation information provided in the configuration information (e.g., SPS-Config IE). In addition, DCI may include resource allocation information for an SPS PDSCH for retransmission when retransmission of the SPS PDSCH for an activated SPS configuration is requested from a UE.

In addition, one or more SPS configurations may be activated for a UE, and in this case, a UE may receive respective activation DCI for one or more SPS configurations from a base station.

In addition, a TCI state for one or more SPS configurations configured for a UE may be configured by configuration information (e.g., SPS-Config IE) related to the SPS configuration, or may be configured/indicated the MAC CE described above or indicated by activation DCI.

A UE receives an SPS PDSCH (through/using TRP 1 (and/or TRP 2)) from a base station (S1103).

Here, a UE may receive the same transport block (TB) or different TBs through SPS PDSCH transmission in a first SPS PDSCH resource set and a second SPS PDSCH resource set for one or more SPS configurations from a base station.

In addition, different transmission configuration indication (TCI) states may be configured for the first SPS PDSCH resource set and the second SPS PDSCH resource set, and a reference signal for QCL for a DMRS of the SPS PDSCH in the first SPS PSSCH resource set and the second SPS PDSCH resource set may be provided by a TCI state for a corresponding SPS PDSCH resource set. That is, a DMRS of the SPS PDSCH in the first SPS PDSCH resource set and the second SPS PDSCH resource set may be QCLed with references of the different TCI states.

Here, for example, according to the Embodiment 7, the first SPS PDSCH resource set and the second SPS PDSCH resource set may be associated with a single SPS configuration. In this case, the same HARQ process identifier (ID) may be determined for the first SPS PDSCH resource set and the second SPS PDSCH resource set within the same SPS PDSCH period.

Also, for example, according to the Embodiment 8, the first SPS PDSCH resource set and the second SPS PDSCH resource set may be associated with a first SPS configuration and a second SPS configuration, respectively. In this case, SPS PDSCH transmission periods for the first SPS configuration and the second SPS configuration may be aligned.

Meanwhile, although not shown in FIG. 11, a UE may transmit HARQ-ACK information for an SPS PDSCH in a first SPS PDSCH resource set to a base station. In addition, a UE may transmit HARQ-ACK information for an SPS PDSCH in a second SPS PDSCH resource set to a base station. Here, HARQ-ACK information may be transmitted through a PUCCH and a PUSCH.

For example, when the same TB is transmitted through a first SPS PDSCH set and a second SPS PDSCH set, PUCCH resources for transmitting HARQ-ACK information for the first SPS PDSCH set and the second SPS PDSCH set may be configured/determined as the same resource or individually configured/determined as different resources.

In addition, when different TBs are transmitted through a first SPS PDSCH set and a second SPS PDSCH set, PUCCH resources for transmitting HARQ-ACK information for each SPS PDSCH set may be individually configured/determined. Here, each PUCCH resource may be transmitted by applying a TCI state for a mapped/associated SPS PDSCH set. That is, an uplink transmission spatial filter in a corresponding PUCCH resource may be determined based on a TCI state for an associated/mapped SPS PDSCH set.

Figure 12:
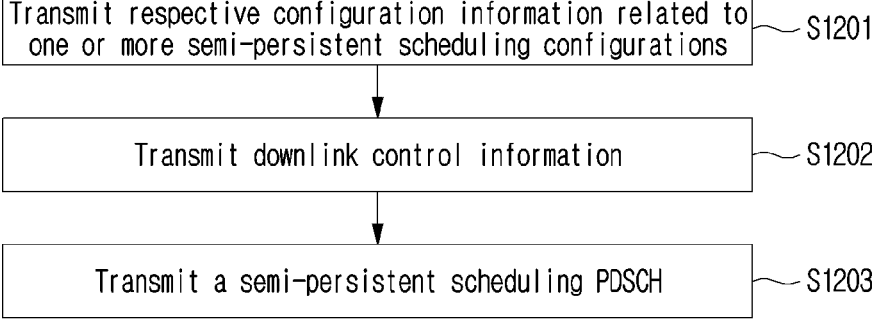
FIG. 12 is a diagram illustrating an operation of a base station for a method for transmitting and receiving a semi-persistent scheduling PDSCH according to an embodiment of the present disclosure.

FIG. 12 is a diagram illustrating an operation of a base station for a method for transmitting and receiving a semi-persistent scheduling PDSCH according to an embodiment of the present disclosure.

Referring to FIG. 12, FIG. 12 exemplifies an operation of a base station based on the proposed methods (e.g., Embodiments 1 to 8 and a combination of one or more proposed methods in Embodiments 1 to 8). FIG. 12 is only for convenience of description, but it is not intended to limit a scope of the present disclosure. Some step(s) shown in FIG. 12 may be omitted according to situations and/or configurations, etc. In addition, a base station in FIG. 12 is only one example, and may be implemented as an apparatus illustrated in FIG. 13. For example, a processor (102/202) of FIG. 13 may control to transmit and receive channel/signal/data/information, etc. by using a transceiver (106/206), and control to store transmitted or received channel/signal/data/information in a memory (104/204).

In addition, an operation of FIG. 12 may be processed by one or more processors (102, 202) of FIG. 13. In addition, an operation of FIG. 12 may be stored in a memory (e.g., one or more memories (104, 204) of FIG. 13) in a form of an instruction/program (e.g., instruction, executable code) for driving at least one processor (e.g., 102, 202) of FIG. 13.

A base station transmits respective configuration information related to one or more semi-persistent scheduling (SPS) configurations (through/using TRP 1 (and/or TRP 2)) to a UE (S1201).

The configuration information related the SPS configuration may include configuration information related to an SPS configuration described in the above-described proposed methods (e.g., Embodiments 1 to 8 and a combination of one or more proposed methods in Embodiments 1 to 8). For example, one or more SPS configurations may be configured for a UE, and respective configuration information (e.g., SPS-Config IE) for each of one or more SPS configurations may include information/parameters exemplified in Table 6 above.

In addition, although not shown in FIG. 12, a base station may transmit configuration information for a configuration of a joint TCI and/or a separate DL/UL TCI (via/with TRP 1 (and/or TRP 2)) to a UE. For example, the configuration information may provide a reference signal for QCL for a DMRS/downlink signal (e.g., CSI-RS) of a downlink channel (e.g., PDSCH, PDCCH), and/or may include a list of TCI states providing reference for determining an uplink transmission spatial filter of a DMRS/uplink signal (e.g., SRS) of an uplink channel (e.g., PUSCH, PUCCH).

In addition, for example, respective configuration information for each SPS configuration according to the above-described Embodiment may include information on a logical channel associated with the corresponding SPS configuration.

In addition, respective configuration information for each SPS configuration according to the above-described Embodiment may include information on a TCI state for the corresponding SPS configuration. Here, a TCI state for a corresponding SPS configuration may be configured/indicated within the above-described list of TCI states.

Meanwhile, although not shown in FIG. 12, a base station may transmit a MAC CE for activating and/or deactivating a downlink (or joint) TCI state (i.e., activation command) via/using TRP 1 (and/or TRP 2) to a UE. The MAC CE may indicate activation and/or deactivation of one or more TCI states (i.e., one or more TCI states in a TCI state list) for a downlink channel/signal, and may be used to map one TCI state for a downlink channel/signal (i.e., a TCI state in a TCI state list) to a codepoint of a TCI field in DCI.

For example, according to the Embodiment 8, a base station may transmit a single MAC CE for activation and/or deactivation of a TCI state for a first SPS PDSCH resource set (e.g., a first SPS configuration) and a second SPS PDSCH resource set (e.g., a second SPS configuration) (via/using TRP 1 (and/or TRP 2)) to a UE. In this case, a TCI state indicated by the MAC CE may be activated and/or deactivated from the first SPS PDSCH period after the UE receives the MAC CE or the UE transmits an ACK for the MAC CE.

A base station transmits downlink control information (through/using TRP 1 (and/or TRP 2)) to a UE (S1202).

Here, downlink control information (DCI) may be transmitted through a PDCCH and may be used to trigger activation/release of a specific SPS configuration among one or more SPS configurations configured for a UE. In addition, DCI may provide additional information to resource allocation information provided in the configuration information (e.g., SPS-Config IE). In addition, DCI may include resource allocation information for an SPS PDSCH for retransmission when retransmission of the SPS PDSCH for an activated SPS configuration is requested from a UE.

In addition, one or more SPS configurations may be activated for a UE, and in this case, a base station may transmit respective activation DCI for one or more SPS configurations to a UE.

In addition, a TCI state for one or more SPS configurations configured for a UE may be configured by configuration information (e.g., SPS-Config IE) related to the SPS configuration, or may be configured/indicated the MAC CE described above or indicated by activation DCI.

A base station transmits an SPS PDSCH (through/using TRP 1 (and/or TRP 2)) to a UE (S1203).

Here, a base station may transmit the same transport block (TB) or different TBs through SPS PDSCH transmission in a first SPS PDSCH resource set and a second SPS PDSCH resource set for one or more SPS configurations to a UE.

In addition, different transmission configuration indication (TCI) states may be configured for the first SPS PDSCH resource set and the second SPS PDSCH resource set, and a reference signal for QCL for a DMRS of the SPS PDSCH in the first SPS PSSCH resource set and the second SPS PDSCH resource set may be provided by a TCI state for a corresponding SPS PDSCH resource set. That is, a DMRS of the SPS PDSCH in the first SPS PDSCH resource set and the second SPS PDSCH resource set may be QCLed with references of the different TCI states.

Here, for example, according to the Embodiment 7, the first SPS PDSCH resource set and the second SPS PDSCH resource set may be associated with a single SPS configuration. In this case, the same HARQ process identifier (ID) may be determined for the first SPS PDSCH resource set and the second SPS PDSCH resource set within the same SPS PDSCH period.

Also, for example, according to the Embodiment 8, the first SPS PDSCH resource set and the second SPS PDSCH resource set may be associated with a first SPS configuration and a second SPS configuration, respectively. In this case, SPS PDSCH transmission periods for the first SPS configuration and the second SPS configuration may be aligned.

Meanwhile, although not shown in FIG. 11, a base station may receive HARQ-ACK information for an SPS PDSCH in a first SPS PDSCH resource set from a UE. In addition, a base station may receive HARQ-ACK information for an SPS PDSCH in a second SPS PDSCH resource set from a UE. Here, HARQ-ACK information may be transmitted through a PUCCH and a PUSCH.

For example, when the same TB is transmitted through a first SPS PDSCH set and a second SPS PDSCH set, PUCCH resources for transmitting HARQ-ACK information for the first SPS PDSCH set and the second SPS PDSCH set may be configured/determined as the same resource or individually configured/determined as different resources.

In addition, when different TBs are transmitted through a first SPS PDSCH set and a second SPS PDSCH set, PUCCH resources for transmitting HARQ-ACK information for each SPS PDSCH set may be individually configured/determined. Here, each PUCCH resource may be transmitted by applying a TCI state for a mapped/associated SPS PDSCH set. That is, an uplink transmission spatial filter in a corresponding PUCCH resource may be determined based on a TCI state for an associated/mapped SPS PDSCH set. General Device to which the Present Disclosure may be applied FIG. 13 is a diagram which illustrates a block diagram of a wireless communication device according to an embodiment of the present disclosure.

In reference to FIG. 13, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IOT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non- Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:

receiving, by a user equipment (UE) from a base station, respective configuration information related to one or more semi-persistent scheduling (SPS) configurations;

receiving, by the UE from the base station, respective downlink control information (DCI) for activating the one or more SPS configurations; and receiving, by the UE from the base station, the same transport block (TB) through SPS PDSCH reception in a first SPS physical downlink shared channel (PDSCH) resource set and a second SPS PDSCH resource set for the one or more SPS configurations, wherein different transmission configuration indication (TCI) states are configured for the first SPS PDSCH resource set and the second SPS PDSCH resource set.

2. The method of claim 1, wherein the first SPS PDSCH resource set and the second SPS PDSCH resource set are associated with a single SPS configuration.

3. The method of claim 2, wherein the same hybrid automatic repeat request (HARQ) process identifier (ID) is determined for the first SPS PDSCH resource set and the second SPS PDSCH resource set in the same SPS PDSCH transmission period.

4. The method of claim 1, wherein the first SPS PDSCH resource set and the second SPS PDSCH resource set are associated with a first SPS configuration and a second SPS configuration, respectively.

5. The method of claim 4, wherein SPS PDSCH transmission periods for the first SPS configuration and the second SPS configuration are aligned.

6. The method of claim 5, further comprising:

receiving a single medium access control (MAC) control element (CE) for activation and/or deactivation of TCI states for the first SPS PDSCH resource set and the second SPS PDSCH resource set.

7. The method of claim 6, wherein a TCI state indicated by the MAC CE is activated and/or deactivated from an initial SPS PDSCH transmission period after the MAC CE is received or an ACK (acknowledgement) for the MAC CE is transmitted.

8. The method of claim 1, wherein physical uplink control channel (PUCCH) resources for transmitting hybrid automatic repeat request-acknowledgement (HARQ-ACK) information for the first SPS PDSCH resource set and the second SPS PDSCH resource set are configured as the same resource or individually determined as different resources.

9. A user equipment (UE) comprising:

at least one transceiver for transmitting and receiving a wireless signal; and at least one processor for controlling the at least one transceiver, wherein the at least one processor is configured to:

receive, from a base station, respective configuration information related to one or more semi-persistent scheduling (SPS) configurations;

receive, from the base station, respective downlink control information (DCI) for activating the one or more SPS configurations; and receive, from the base station, the same transport block (TB) through SPS PDSCH reception in a first SPS physical downlink shared channel (PDSCH) resource set and a second SPS PDSCH resource set for the one or more SPS configurations, wherein different transmission configuration indication (TCI) states are configured for the first SPS PDSCH resource set and the second SPS PDSCH resource set.

10. A base station comprising:

at least one transceiver for transmitting and receiving a wireless signal; and at least one processor for controlling the at least one transceiver, wherein the at least one processor is configured to:

transmit, to a user equipment (UE), respective configuration information related to one or more semi-persistent scheduling (SPS) configurations;

transmit, to the UE, respective downlink control information (DCI) for activating the one or more SPS configurations; and transmit, to the UE, the same transport block (TB) through SPS PDSCH transmission in a first SPS physical downlink shared channel (PDSCH) resource set and a second SPS PDSCH resource set for the one or more SPS configurations, wherein different transmission configuration indication (TCI) states are configured for the first SPS PDSCH resource set and the second SPS PDSCH resource set.

* * * * *